INVENTORS
BURTIS W. MEYER
GEORGE M. MILLER
BY Samuel E. Turner
ATTORNEY

|  | A-5 | A-4 | A-3 | A-2 | A-1 |
|---|---|---|---|---|---|
| V0  | 0 | 0 | 0 | 0 | 0 |
| V1  | 0 | 0 | 0 | 0 | 1 |
| V2  | 0 | 0 | 0 | 1 | 0 |
| V3  | 0 | 0 | 0 | 1 | 1 |
| V4  | 0 | 0 | 1 | 0 | 0 |
| V5  | 0 | 0 | 1 | 0 | 1 |
| V6  | 0 | 0 | 1 | 1 | 0 |
| V7  | 0 | 0 | 1 | 1 | 1 |
| V8  | 0 | 1 | 0 | 0 | 0 |
| V9  | 0 | 1 | 0 | 0 | 1 |
| V10 | 0 | 1 | 0 | 1 | 0 |
| V11 | 0 | 1 | 0 | 1 | 1 |
| V12 | 0 | 1 | 1 | 0 | 0 |
| V13 | 0 | 1 | 1 | 0 | 1 |
| V14 | 0 | 1 | 1 | 1 | 0 |
| V15 | 0 | 1 | 1 | 1 | 1 |
| V16 | 1 | 0 | 0 | 0 | 0 |
| V17 | 1 | 0 | 0 | 0 | 1 |
| V18 | 1 | 0 | 0 | 1 | 0 |
| V19 | 1 | 0 | 0 | 1 | 1 |
| V20 | 1 | 0 | 1 | 0 | 0 |
| V21 | 1 | 0 | 1 | 0 | 1 |
| V22 | 1 | 0 | 1 | 1 | 0 |
| V23 | 1 | 0 | 1 | 1 | 1 |
| V24 | 1 | 1 | 0 | 0 | 0 |
| V25 | 1 | 1 | 0 | 0 | 1 |
| V26 | 1 | 1 | 0 | 1 | 0 |
| V27 | 1 | 1 | 0 | 1 | 1 |
| V28 | 1 | 1 | 1 | 0 | 0 |
| V29 | 1 | 1 | 1 | 0 | 1 |
| V30 | 1 | 1 | 1 | 1 | 0 |
| V31 | 1 | 1 | 1 | 1 | 1 |

FIG. 9

$X11 = V1 + V3 + V5 + V7 + V9 + V11$
$\quad + V13 + V15 + V17 + V19 + V21$
$\quad + V23 + V25 + V27 + V29 + V31$ $X12 = V0 + V2 + V4 + V6 + V8 + V10$
$\quad + V12 + V14 + V16 + V18 + V20$
$\quad + V22 + V24 + V26 + V28 + V30$ $X21 = V2 + V3 + V6 + V7 + V10 + V11$
$\quad + V14 + V15 + V18 + V19 + V22$
$\quad + V23 + V26 + V27 + V30 + V31$ $X22 = V0 + V1 + V4 + V5 + V8 + V9$
$\quad + V12 + V13 + V16 + V17 + V20$
$\quad + V21 + V24 + V25 + V28 + V29$ $X31 = V4 + V5 + V6 + V7 + V12 + V13$
$\quad + V14 + V15 + V20 + V21 + V22$
$\quad + V23 + V28 + V29 + V30 + V31$ $X32 = V0 + V1 + V2 + V3 + V8 + V9$
$\quad + V10 + V11 + V16 + V17 + V18$
$\quad + V19 + V24 + V25 + V26 + V27$ $X41 = V8 + V9 + V10 + V11 + V12 + V13$
$\quad + V14 + V15 + V24 + V25 + V26$
$\quad + V27 + V28 + V29 + V30 + V31$ $X42 = V0 + V1 + V2 + V3 + V4 + V5$
$\quad + V6 + V7 + V16 + V17 + V18$
$\quad + V19 + V20 + V21 + V22 + V23$ $X51 = V16 + V17 + V18 + V19 + V20 + V21$
$\quad + V22 + V23 + V24 + V25 + V26$
$\quad + V27 + V28 + V29 + V30 + V31$ $X52 = V0 + V1 + V2 + V3 + V4 + V5$
$\quad + V6 + V7 + V8 + V9 + V10 + V11$
$\quad + V12 + V13 + V14 + V15$

FIG. 10

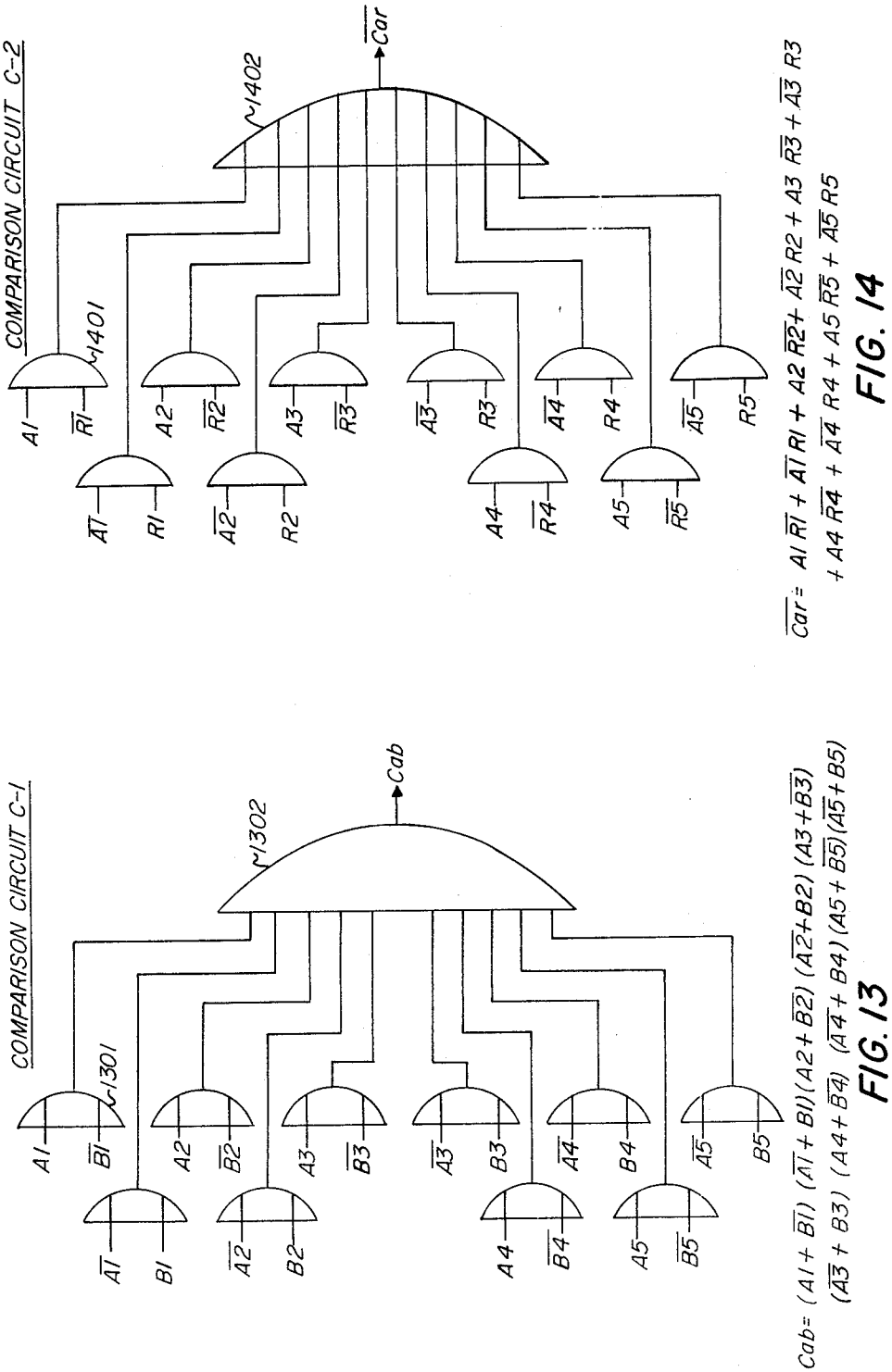

P-COUNTER $*P1 = \overline{P1}\ Si\ T1$ $*\overline{P1} = P1\ Si\ T1 + Ph\ T1$

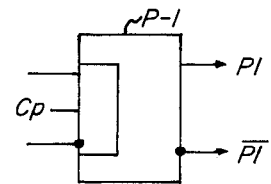

$*P2 = P1\ \overline{P2}\ Si\ T1$ $*\overline{P2} = P1\ P2\ Si\ T1 + Ph\ T1$

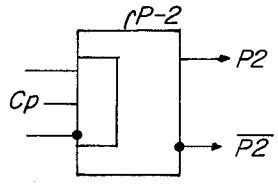

$*P3 = P1\ P2\ \overline{P3}\ Si\ T1$ $*\overline{P3} = P1\ P2\ P3\ Si\ T1 + Ph\ T1$

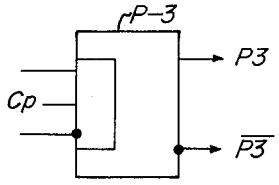

*FIG. 15*

$*Ws = Ph\ \overline{Wp}$ $*\overline{Ws} = Wp$

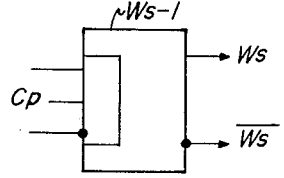

*FIG. 16*

$Si = \overline{A1}\ \overline{A2}\ \overline{A3}\ \overline{A4}\ \overline{A5}\ (\overline{P1} + \overline{P2} + \overline{P3})$
$Ph = A1 + A2 + A3 + A4 + A5$

*FIG. 17*

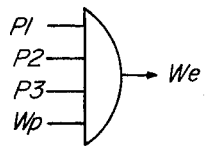

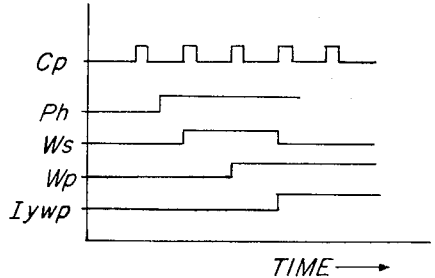

*FIG. 19*

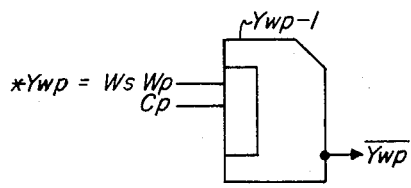
FIG. 20
FIG. 21
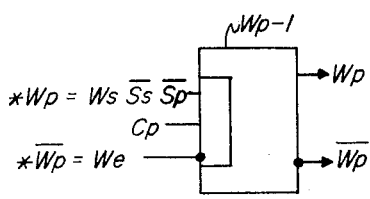
FIG. 22
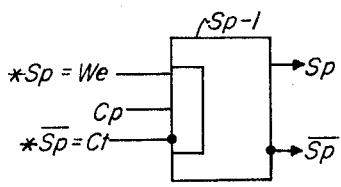
FIG. 23
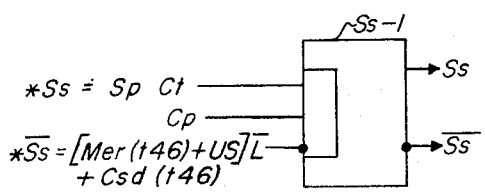
FIG. 24
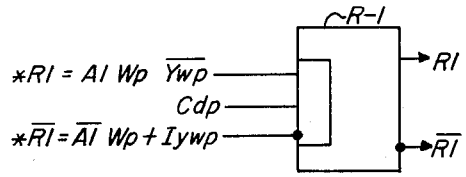
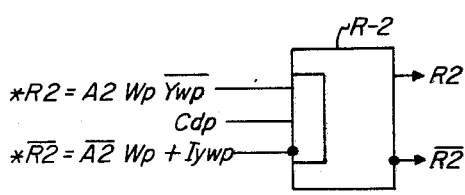
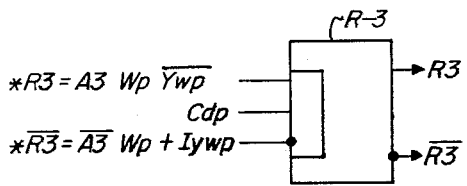
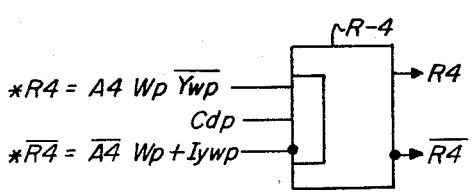
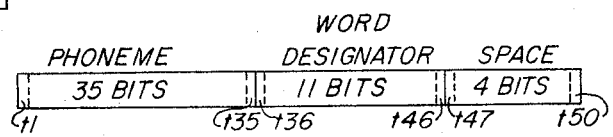
FIG. 25
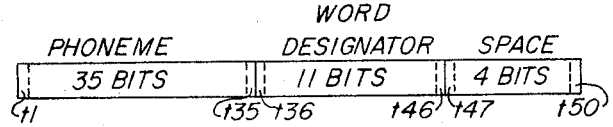
FIG. 26

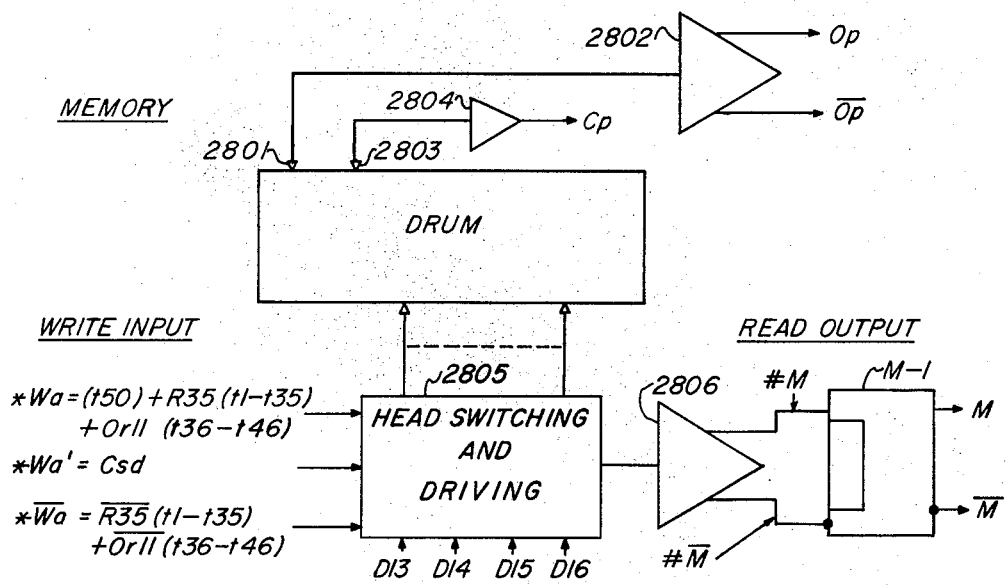
FIG. 28
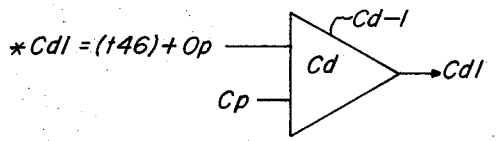
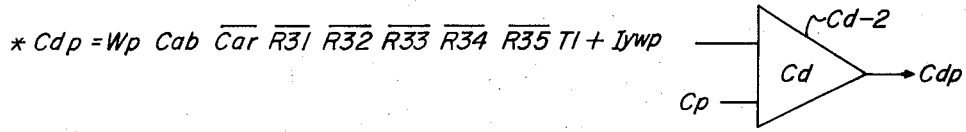
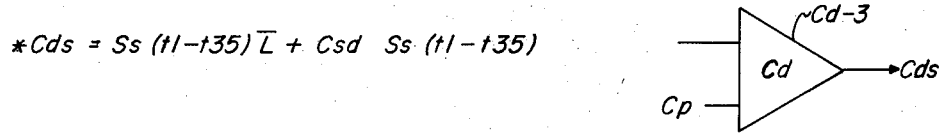
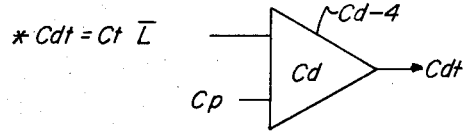
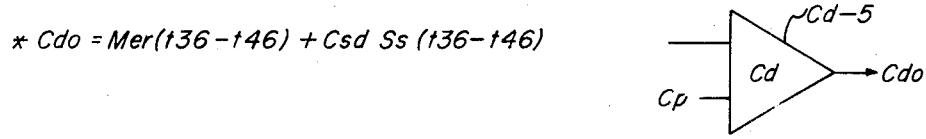
FIG. 29

$Ct = (t46)\ \overline{D7}\ \overline{D8}\ \overline{D9}\ D10\ \overline{D11}\ D12$ $(t1-t35) = \overline{D6} + (\overline{D1}+\overline{D2})\ \overline{D3}\ \overline{D4}\ \overline{D5}\ D6$ $(t36-t46) = (D1+D2)\ \overline{D3}\ \overline{D4}\ D5\ D6 + (D3+D4)(\overline{D3}+\overline{D4})\ D5\ D6$ $(t46) = D1\ D2\ \overline{D3}\ D4\ D5\ D6$ $(t47-t50) = D3\ D4\ D5\ D6$ $(t50) = D1\ D2\ D3\ D4\ D5\ D6$

FIG. 30

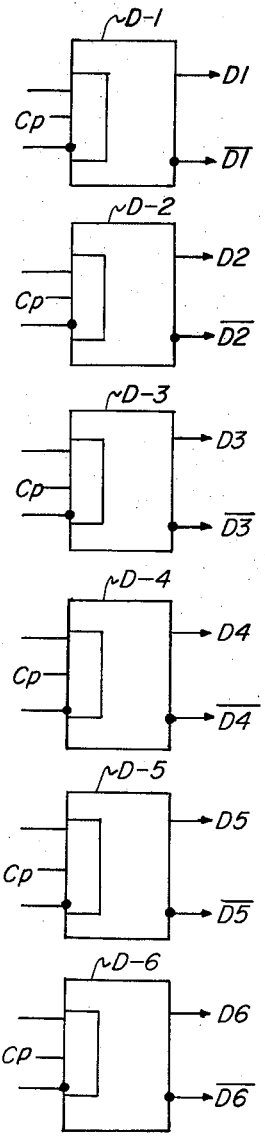

$*D1 = \overline{D1}$ $*\overline{D1} = D1 + Op$ $*D2 = D1\ \overline{D2}$ $*\overline{D2} = D1\ D2 + D2\ \overline{D5}\ D6 + Op$ $*D3 = D1\ D2\ \overline{D3}$ $*\overline{D3} = D1\ D2\ D3 + Op$ $*D4 = D1\ D2\ D3\ \overline{D4}$ $*\overline{D4} = D1\ D2\ D3\ D4 + Op$ $*D5 = D1\ D2\ D3\ D4\ \overline{D5} + D2\ \overline{D5}\ D6$ $*\overline{D5} = D1\ D2\ D3\ D4\ D5 + Op$ $*D6 = D1\ D2\ D3\ D4\ D5\ \overline{D6}$ $*\overline{D6} = D1\ D2\ D3\ D4\ D5\ D6 + Op$

FIG. 31

$*D7 = \overline{D7} + Op$ $*\overline{D7} = D7\ \overline{Op}$ $*D8 = D7\ \overline{D8}\ \overline{Op}$ $*\overline{D8} = D7\ D8 + Op$ $*D9 = D7\ D8\ \overline{D9}$ $*\overline{D9} = D7\ D8\ D9 + Op$ $*D10 = D7\ D8\ D9\ \overline{D10}$ $*\overline{D10} = D7\ D8\ D9\ D10 + D10\ D12 + Op$ $*D11 = D7\ D8\ D9\ D10\ \overline{D11}$ $*\overline{D11} = D7\ D8\ D9\ D10\ D11 + Op$ $*D12 = D7\ D8\ D9\ D10\ D11\ \overline{D12}$ $*\overline{D12} = D10\ D12 + Op$ $T1 = D17\ Ct$ Sept. 1, 1964   B. W. MEYER ETAL   3,147,343
SIGNAL RECOGNITION SYSTEM
Filed June 15, 1961   15 Sheets-Sheet 12

$\#D13 = Ksd13$
$*D13 = \overline{D13}\ Ss$ $*\overline{D13} = D13\ Ss + Sp\ \overline{Ss}$
$\#\overline{D13} = Krd13$ $\#D14 = Ksd14$
$*D14 = D13\ \overline{D14}\ Ss$ $*\overline{D14} = D13\ D14\ Ss + Sp\ \overline{Ss}$
$\#\overline{D14} = Krd14$ $\#D15 = Ksd15$
$*D15 = D13\ D14\ \overline{D15}\ Ss$ $*\overline{D15} = D13\ D14\ D15\ Ss + Sp\ \overline{Ss}$
$\#\overline{D15} = Krd15$ $\#D16 = Ksd16$
$*D16 = D13\ D14\ D15\ \overline{D16}\ Ss$ $*\overline{D16} = D13\ D14\ D15\ D16\ Ss + Sp\ \overline{Ss}$
$\#\overline{D16} = Krd16$

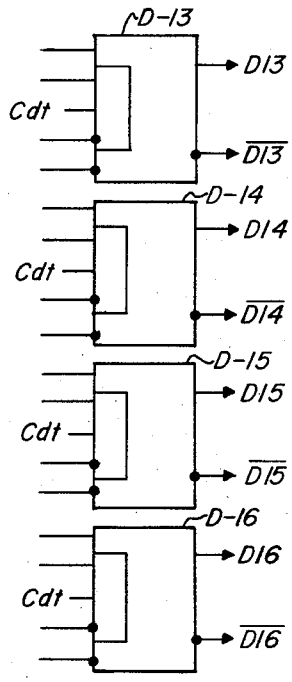

FIG. 35

$*D17 = \overline{D17}\ Ct$ $*\overline{D17} = D17\ Ct$

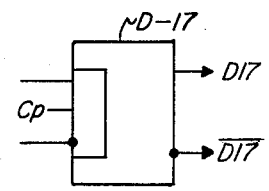

FIG. 36

COMPARISON CIRCUIT C-3

$*Mer = Ss(t50)\ \overline{L}$ $*\overline{Mer} = Ss(R35 + M)(\overline{R35} + \overline{M})(t1-t35)\ \overline{L} + Mer(t46)\overline{L}$

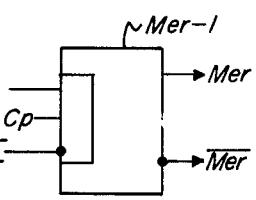

FIG. 37

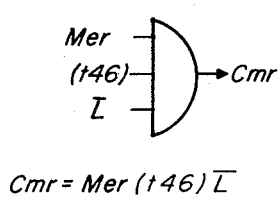

$Cmr = Mer(t46)\overline{L}$

FIG. 38

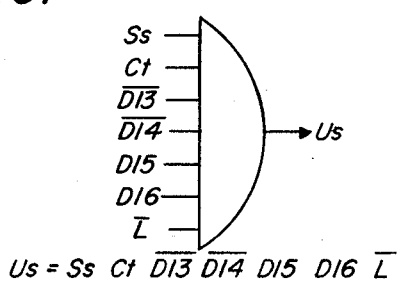

$Us = Ss\ Ct\ \overline{D13}\ \overline{D14}\ D15\ D16\ \overline{L}$

FIG. 39

Or – REGISTER

Or1 = Ksor1

*Or1 = M Mer (t36-t46) $\overline{L}$

*$\overline{Or1}$ = $\overline{M}$ Mer (t36-t46) $\overline{L}$ + Us $\overline{L}$
$\overline{Or1}$ = Kror1

Or2 = Or1 Cdo + Ksor2

*$\overline{Or2}$ = Us $\overline{L}$
$\overline{Or2}$ = $\overline{Or1}$ Cdo + Kror2

Or3 = Or2 Cdo + Ksor3

*$\overline{Or3}$ = Us $\overline{L}$
$\overline{Or3}$ = $\overline{Or2}$ Cdo + Kror3

Or4 = Or3 Cdo + Ksor4

*$\overline{Or4}$ = Us $\overline{L}$
$\overline{Or4}$ = $\overline{Or3}$ Cdo + Kror4

Or11 = Or10 Cdo + Ksor11

*$\overline{Or11}$ = Us $\overline{L}$
$\overline{Or11}$ = $\overline{Or10}$ Cdo + Kror11

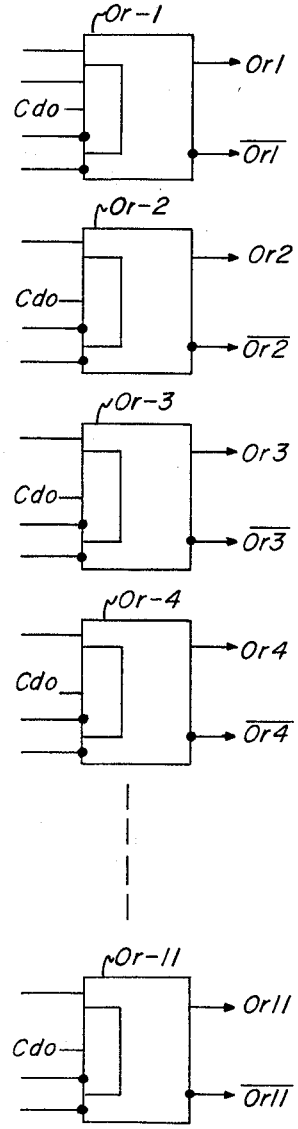

FIG. 40

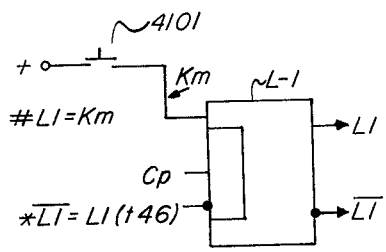
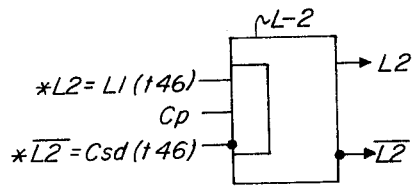
FIG. 41         FIG. 42
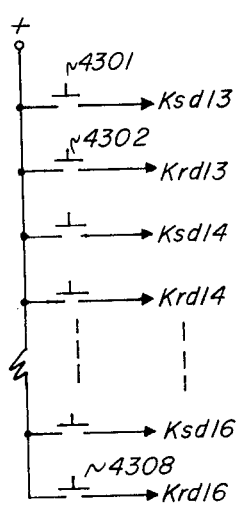
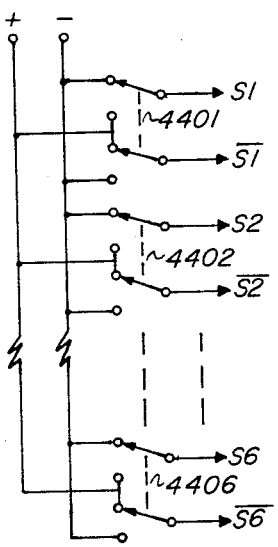
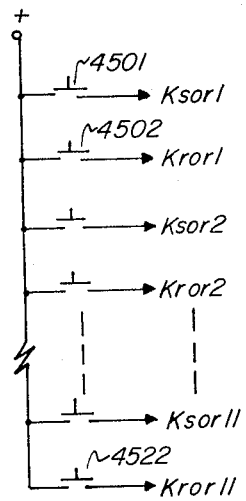
FIG. 43         FIG. 44         FIG. 45

$$Csd = (S1 + \overline{D7})\ (\overline{S1} + D7)\ (S2 + \overline{D8})\ (\overline{S2} + D8)$$
$$(S3 + \overline{D9})\ (\overline{S3} + D9)\ (S4 + \overline{D10})\ (\overline{S4} + D10)$$
$$(S5 + \overline{D11})\ (\overline{S5} + D11)\ (S6 + \overline{D12})\ (\overline{S6} + D12)$$
$$L2\ L$$

United States Patent Office 3,147,343
Patented Sept. 1, 1964

3,147,343
SIGNAL RECOGNITION SYSTEM
Burtis W. Meyer, Palo Alto, and George M. Miller, Mountain View, Calif., assignors to General Electric Company, a corporation of New York
Filed June 15, 1961, Ser. No. 117,324
13 Claims. (Cl. 179—1)

This invention relates to signal recognition systems and particularly to such systems for recognizing signals which have been developed from spoken language.

Many machines which are now controlled by some form of key board input could be operated faster and more efficiently if the operator could merely speak the information into a microphone. Spoken language is composed of basic sounds, each having a characteristic frequency component, which are called phonemes. Examples of phonemes are the sounds of the letters m, n and r. Some combinations of letters in the English language are spoken as a single phoneme such as the "th" in think. Other letters, mainly the vowels, may be spoken as several different phonemes depending on the word in which they appear. For example, the "o" in two is a different phoneme than the "o" in top. A spoken word is recognized by the sequence of phonemes which it contains.

Devices are known in the art for detecting the phonemes of spoken language. In such devices electrical signals from a microphone are applied to a bank of frequency selective filters. The filter corresponding to the predominant frequency component of the spoken phoneme will have the highest output signal. This highest signal may then be detected to produce a corresponding phoneme signal on one of a plurality of phoneme output lines. Such a device is shown, for example, in a U.S. Patent No. 2,646,465, issued to K. H. Davis et al., July 21, 1953, for a Voice-Operated System.

The above-mentioned devices thus detect the phonemes of a word as they are spoken and produce a corresponding sequence of phoneme signals. Signal recognition apparatus is then required to store the sequence of phonemes of a word and to compare the phonemes of the sequence to stored standard phoneme sequences. Once an identity between the received phoneme sequence and the stored standard phoneme sequence is found a corresponding word designator signal can then be produced to carry out the operations desired.

While the basic principles of the system are straightforward several problems are encountered. For example: short periods of silence within the enunciation of a word can be significant and for this reason silence is one of the phonemes to be recognized. Examples of significant silences are those which always proceed an explosive phoneme, such as "p," "b," and "t." However, the system must provide some means for recognizing significant silence and distinguishing it from mere absence of input. Another problem is the wide variation in speaking speed with the result that a phoneme may persist over a variable length of time. Thus if a phoneme is spoken slowly there must be provision for preventing it from being construed as more than one phoneme. On the other hand, short duration noise and transient signals should not be erroneously identified as phonemes. A further problem arises from the well-known fact that a given word may be spoken in several ways, thus giving rise to several different phoneme sequences all having the same meaning. It is, of course, desirable that the phoneme signal recognition system shall produce the same machine output signal for each of these different phoneme sequences. It is also desirable to provide a system in which the stored phoneme sequences can be readily altered or changed to correspond to the speech of the operator.

It is therefore an object of the invention to provide an improved phoneme signal recognition system.

It is a further object of the invention to recognize as phoneme signals only signals which have persisted for a predetermined minimum period.

Another object of the invention is to recognize a lengthy phoneme signal as only one phoneme.

Another object of the invention is to correctly recognize a word which may be spoken in one of several alternative ways.

Another object of the invention is to provide ready change of the stored phoneme sequences.

Another object of the invention is to store a representation of the phoneme sequence of a word as spoken by an operator.

These and other objects of the invention are achieved in a system which receives the successive phoneme signals as they are developed by a phoneme detector in response to a spoken word. The phoneme signals are examined periodically at successive sample times and the phoneme present at a given sample time is accepted if it has persisted for a predetermined number of sample times (thus eliminating short period noise and transient signals) and if it is different from the phoneme last accepted (thereby accounting for slowly spoken phonemes).

The accepted phonemes are assembled in a temporary storage device and when the spoken word has ended this assembled sequence of phonemes is compared with a set of phoneme sequences stored in a memory which constitutes a dictionary of all of the allowable ways of speaking each word of the vocabulary of words to be recognized.

Associated with each of the phoneme sequencies stored in the memory is a word designator which is a machine language representation of the corresponding spoken word. When a comparison is found between the assembled sequence of phonemes and a stored phoneme sequence in the memory, the associated word designator is made available as a manifestation of the identity of the corresponding spoken word and it may then be used for control of external equipment or the like.

Provision is also made for changing the stored phoneme sequences in the memory so that representations of new words or different ways of pronouncing the same word may be stored therein. To do this the desired word is spoken into the microphone of the phoneme detector and the system assembles the sequence of phonemes as described above. This sequence of phonemes is then transferred to a pre-selected address in the memory unit along with a corresponding word designator.

The invention will be more specifically described with reference to the following drawings in which:

FIGURE 9 is a chart showing the binary encoding of the phoneme signals from the phoneme detector;

FIGURE 10 is an illustration of an encoder structure in logic equation form;

FIGURE 13 is a block diagram together with the logic equation of a logic circuit for comparing the phoneme representations in the A and B registers;

FIGURE 14 is a block diagram together with the logic equation of a logic circuit for comparing the phoneme representation in A-register with the phoneme representation in the first five stages of an R-register;

FIGURE 15 is an illustration of a counter circuit for distinguishing between intra-word silence and the end of a word;

FIGURE 16 is an illustration of a circuit for storing an indication of the start of a word;

FIGURE 17 illustrates, in logic equation form, logic circuits for producing silence and phoneme presence signals;

FIGURE 18 is a diagram and logic equation of a logic circuit for producing a word end signal;

FIGURE 19 is a partial timing diagram illustrating certain control signals of the system;

FIGURE 20 shows a control one-shot circuit together with its input logic circuit in logic equation form which is triggered at the start of each spoken word;

FIGURE 21 illustrates an inverter which receives the output signal from the one-shot of FIG. 20;

FIGURE 22 illustrates a control flip-flop together with its input logic circuit in logic equation form which stores an indication that a spoken word is in progress;

FIGURE 23 illustrates another control flip-flop and its input logic circuit in logic equation form which stores an indication that the spoken word has ended;

FIGURE 24 illustrates another control flip-flop and its input logic circuit in logic equation form which enables a serial shift of a storage register (R-register) for comparing a new phoneme sequence with the stored phoneme sequences;

FIGURE 25 illustrates the first five stages of a register circuit (R-register) together with the * input logic circuits shown in logic equation form;

FIGURE 26 illustrates one sector of a memory drum employed in the illustrated embodiment of the invention;

FIGURE 28 illustrates portions of a memory unit;

FIGURE 29 illustrates various clock pulse driver circuits with the input logic gating circuits thereof shown in logic equation form;

FIGURE 30 illustrates in logic equation form the equivalent gating circuits of various parenthetical terms;

FIGURE 31 illustrates a six-stage bit counter with the input logic circuits thereof shown in logic equation form;

FIGURE 35 illustrates a four-stage track counter with the input logic circuits thereof shown in logic equation form;

FIGURE 36 illustrates a flip-flop circuit with its input logic circuit shown in logic equation form which forms a scale of two counter for counting down the drum revolutions;

FIGURE 37 illustrates a flip-flop circuit together with its input logic circuit shown in logic equation form which indicates that a comparison has been found between a received phoneme sequence and a phoneme sequence stored in the memory;

FIGURE 38 illustrates a gating circuit which produces a timed comparison signal;

FIGURE 39 illustrates a gating circuit which produces an unsuccessful search signal;

FIGURE 40 illustrates an eleven-stage output register together with its input logic circuits shown in logic equation form;

FIGURE 41 illustrates a Load control flip-flop together with its input logic circuit partly in logic equation form;

FIGURE 42 illustrates another Load control flip-flop together with its input logic circuit shown in logic equation form;

FIGURE 43 illustrates a bank of push-button switches for placing a track address in the track counter of FIG. 35 during a Load operation;

FIGURE 44 illustrates a bank of double-pole, double-throw switches for setting up a representation of the address of the sector in which a new word is to be stored during a Load operation;

FIGURE 45 illustrates a bank of push-button switches for placing a word designator corresponding to a new word into the output register.

Figure 1:
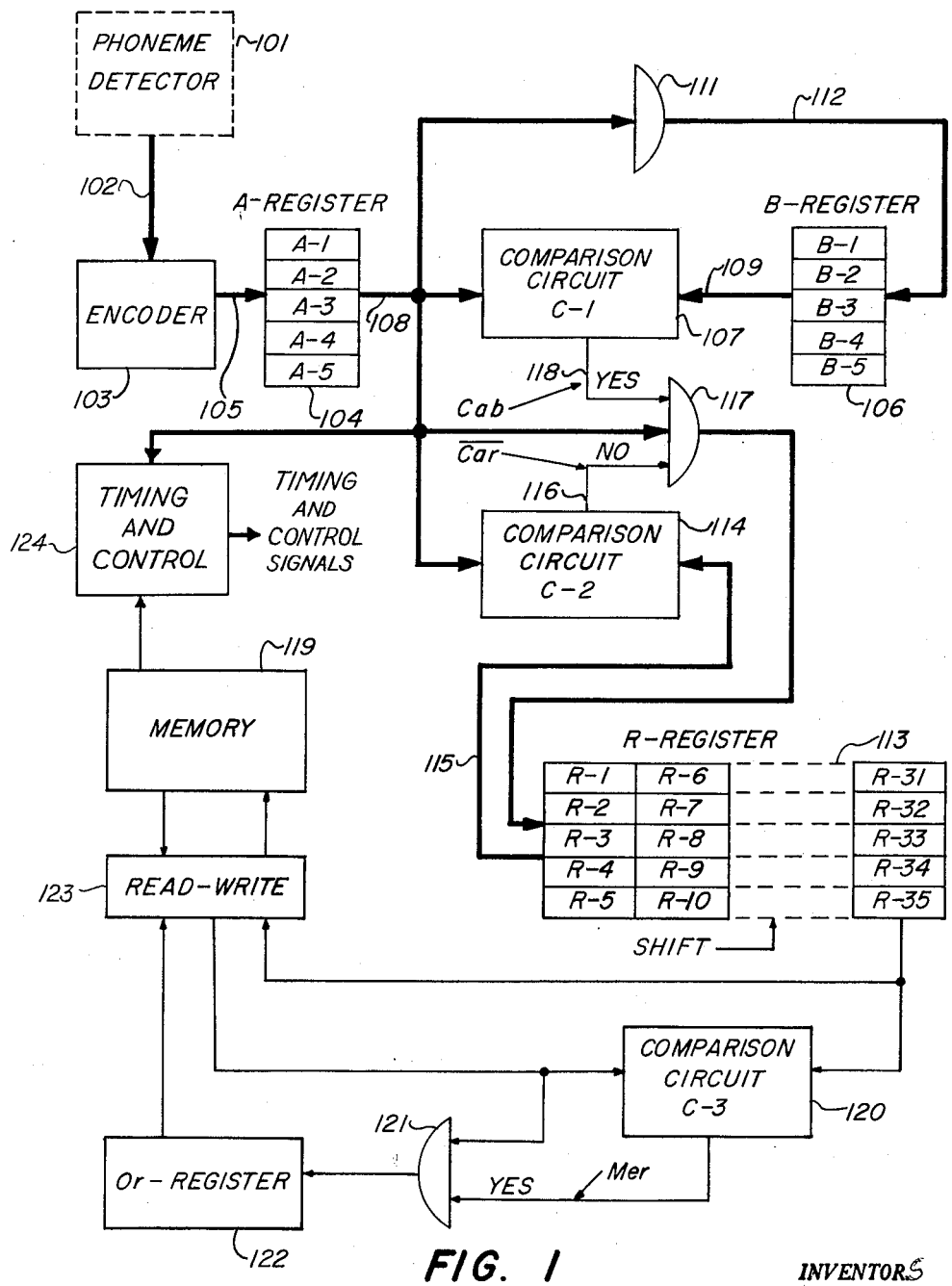
FIGURE 1 is a block diagram of the phoneme signal recognition system of the invention.

Shown in FIG. 1 is a block diagram of an illustrative embodiment of a signal recognition system of the present invention. A phoneme detector 101 furnishes input signals to the present system. Details of the phoneme detector are not shown herein since it is merely one example of a source of signals which may be recognized by the system. An example of a phoneme detector is shown in the above-mentioned Patent No. 2,646,465.

The heavy interconnecting lines in FIG. 1 indicate a plurality of separate conductors, which will be referred to as cables. Thus input to the system from the phoneme detector is by way of a cable 102 comprising a plurality of phoneme lines, each of the lines corresponding to a respective one of the phonemes. The phoneme input signals are mutually exclusive. That is, there can be only one phoneme signal present at any given time. For purposes of a present explanation it will be assumed that the cable 102 consists of 32 lines corresponding to 32 respective separate phonemes.

Figure 11:
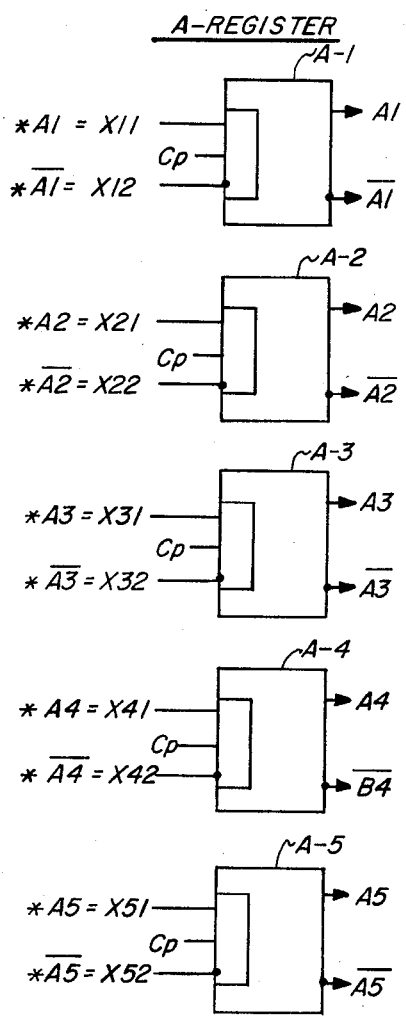
FIGURE 11 is an illustration of a register circuit (A-register) with the input logic circuit thereof shown in logic equation form.

The phoneme lines of cable 102 from the phoneme detector are connected to respective input terminals of an encoder 103. (A specific structure of encoder 103 is illustrated in logic equation form in FIG. 10.) The encoder 103 converts each phoneme signal received on any one of the 32 phoneme lines to a five-bit binary character which is immediately stored in a register 104 designated the A-register. The A-register is a five-stage register which receives the binary signals in parallel via a cable 105 from the encoder. (An embodiment of A-register is shown in FIG. 11.)

Figure 12:
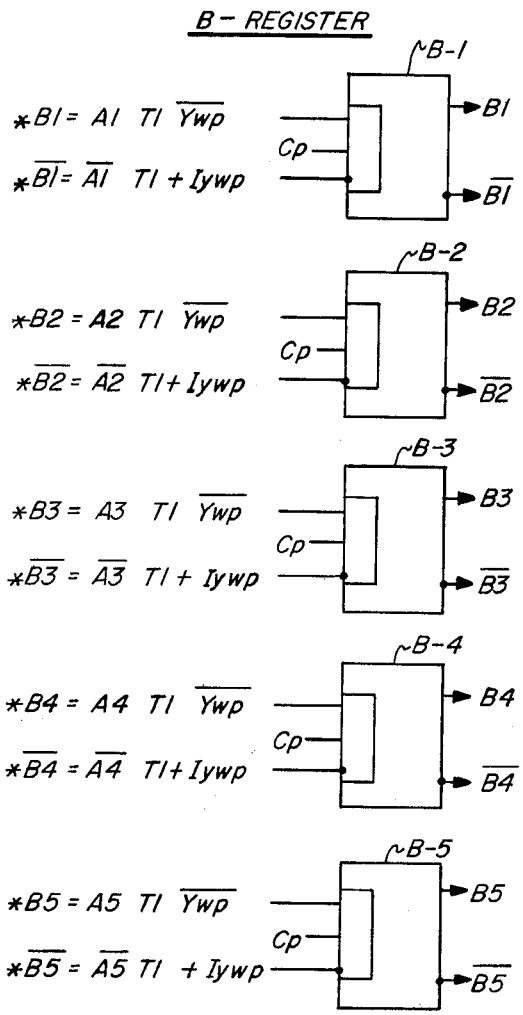
FIGURE 12 is an illustration of a register circuit (B-register) with the input logic circuit thereof shown in logic equation form.

To insure that a phoneme has persisted for at least a predetermined time and to thus distinguish it from noise or other spurious signals, a register 106 designated the B-register is provided for storing the encoded representation of the previous phoneme. (An embodiment of B-register is shown in FIG. 12.) The contents of the A-register are compared with the contents of the B-register by means of a circuit 107 designated a comparison circuit C–1, the output terminals of A and B register being connected to the comparison circuit C–1 by a pair of cables 108 and 109. (A specific structure of comparison circuit C–1 is illustrated in FIG. 13.) If the information representing states of the stages of the A and B registers are the same, the phoneme signal has persisted for two sample times and the comparison circuit C–1 produces an arming potential on a lead 113 which partially enables a transfer circuit 117. At the same time a comparison is made between the stages of the A-register and the first five stages of a phoneme assembly register 113, designated the R-register. (The first five stages of R-register are shown in FIG. 25.) A comparison between the A-register and the first five stages of the R-register is made to insure that the phoneme is not stored twice in succession even though it has persisted for two or more sample times. This comparison is made by a circuit 114 designated a comparison circuit C-2 which is connected to the stages of the A-register by the cable 108 and to the first five stages of the R-register by a cable 115. (An embodiment of comparison circuit C-2 is shown in FIG. 14.) If the information representing states of the stages of the A-register and the first five stages of the R-register are the same then no new phoneme is present and the phoneme of the present sample time is ignored. If however they are different a new phoneme is present and the comparison circuit C-2 produces an arming potential on a lead 116 connected to an input terminal of the transfer circuit 117. This arming potential completes the enablement of the transfer circuit 117. (The transfer circuit 117 comprises the * logic input circuit to the first five stages of R-register as illustrated in logic equation form in FIG. 25.) Thus when the two conditions are met, namely, that the encoded phoneme in A-register is the same as that in the B-register but different from the encoded phoneme in the first five stages of the R-register, the new phoneme is to be accepted and the transfer circuit 117 is enabled to cause the transfer of the new encoded phoneme in the A-register to the first five stages of the R-register in response to a sample signal which occurs each sample time (approximately every 20 milliseconds). (Simultaneously the new encoded phoneme in A-register is transferred, via a transfer circuit 111 and a cable 112, to the B-register where it is then available for comparison with the next phoneme.) (The transfer circuit 111 comprises the * logic input circuit to the stages of B-register as illustrated in logic equation form in FIG. 12.)

Figure 27:
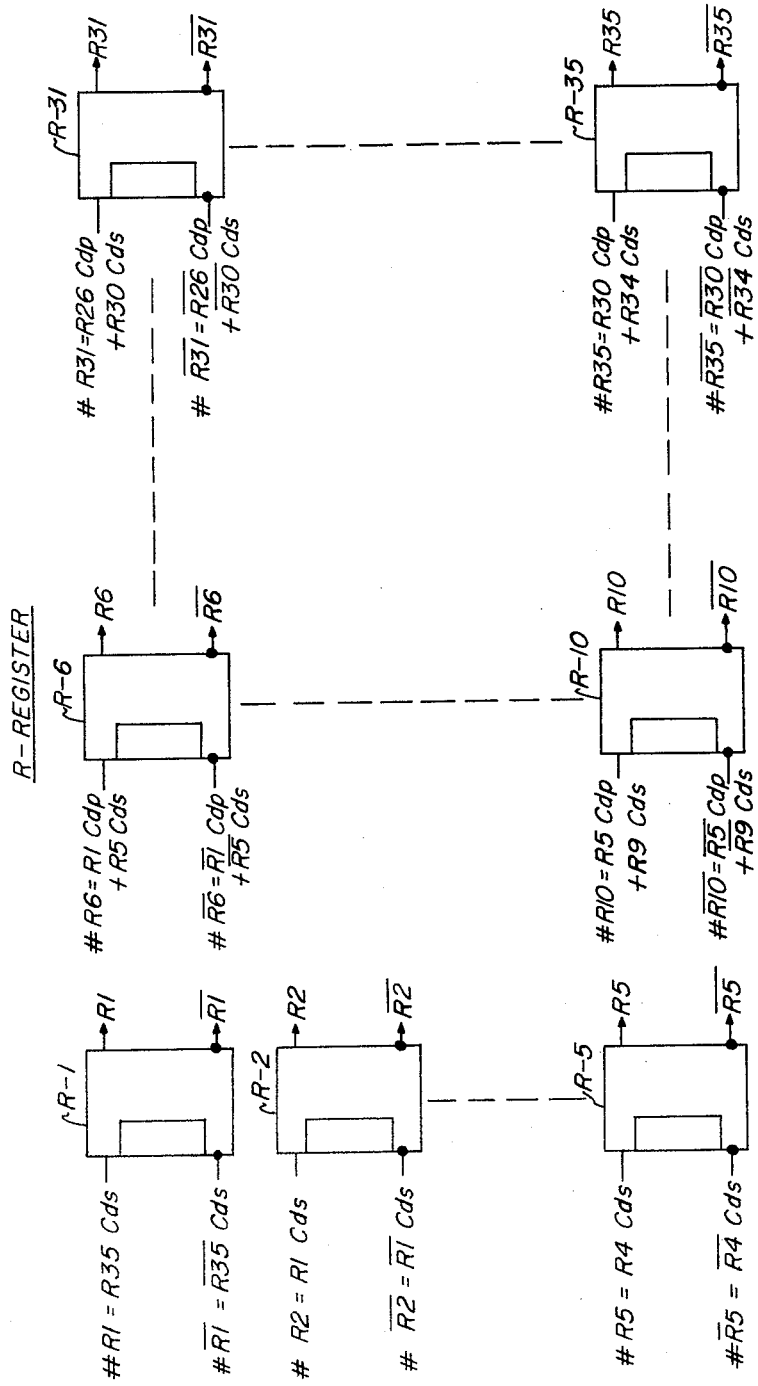
FIGURE 27 illustrates the entire R-register together with the # input logic circuits illustrated in logic equation form.

In the illustrated embodiment of the invention the R-register comprises 35 stages, that is, seven columns of five stages each. (An embodiment of R-register is illustrated in FIG. 27.) Thus the R-register is capable of assembling and storing a sequence of seven phonemes. Simultaneous with the transfer of a new phoneme representation from the A-register to the first column of stages of the R-register the R-register undergoes a column-by-column shift to the right, in other words, the phoneme representation contained in the first column of stages of the R-register is transferred to the stages of the second column of the R-register, and so forth. This assembly of a sequence of phoneme representations in the R-register continues until the spoken word has ended or until the R-register is filled. If it should be desirable to recognize words comprising a sequence of more than seven phonemes the R-register may be expanded to a correspondingly greater number of columns of stages.

Once a sequence of phoneme representations have been assembled in the R-register it can then be identified. This identification is accomplished by providing a memory unit 119 in which is stored a dictionary of phoneme sequences of all the allowable ways of saying each word of the vocabulary of words to be recognized. Associated with the phoneme sequences stored in the memory unit is a unique binary representation for the spoken word called the word designator, the same word designator being associated with each of the phoneme sequences which are alternative ways of saying the same word.

In the illustrated embodiment of the invention the memory unit 119 includes a magnetic drum (shown in FIG. 28). Thus the information stored thereon is available serially as the drum rotates. A Read-Write circuit 123 provides access to the memory. (The Read-Write circuit 123 comprises Write Input, Head Switching and Driving, and Read Output circuits as shown in FIG. 28.)

Thus when assembly of the unknown phoneme sequence in the R-register has been completed, logic connections are made which cause an end-around serial shift of the information in the R-register. (R-1 to R-2, R-2 to R-3, . . . and R-35 to R-1.) As the serial shift proceeds the binary representing state of stage R-35 is compared with the respective bits of the stored encoded phonemes as they are read from the drum. A track counter and a head switching circuit are provided to automatically switch tracks so that the entire memory may be searched.

A circuit 120 designated a comparison circuit C-3 compares the phoneme signals read from the memory with the state of stage R-35 of R-register. (An embodiment of comparison circuit C-2 is illustrated in FIG. 37.) When a comparison is found a signal from the comparison circuit C-3 arms a transfer circuit 121 and the word designator which is associated with the stored phoneme sequence is read out of the memory and into an output register 122 (Or-register) where it is available for use by external equipment. (An embodiment of the Or-register is shown in FIG. 40. The transfer circuit 121 comprises the * logic input circuit of Or-register.)

The system of the present invention is also adapted to perform the task of loading phoneme sequences into the memory unit. This is a useful feature for it allows an operator to readily store in the memory the phoneme sequences corresponding to his way of speaking the words of the vocabulary. To accomplish this, the operator speaks the new word into the microphone of the phoneme detector and the system detects the phonemes of the word and stores them in the R-register in the manner outlined hereinbefore. The operator also places the corresponding word designator in the output register 122. He also sets addressing circuits of the memory unit so that the new phoneme sequence will be recorded in a chosen location in the memory. The phoneme sequence is then written into the memory from the R-register followed by the word designator from the output register 122.

The various timing and control elements necessary for the system of the present invention are represented in FIG. 1 by a block 124 designated Timing and Control. (Specific embodiments of the various timing and control circuits are illustrated in FIGS. 15–18, 20–24, 38, 39 and 41–46.) Timing and control signals which emanate from circuit 124 are applied to various elements of the system as shown in the specific illustrations of the elements.

A general description of the signal recognition system of the present invention has been given above in connection with FIG. 1. The individual elements comprising the system will be described more specifically after the following brief description of basic circuit elements.

The following circuits find employment in the system: AND gate, OR gate, flip-flop, clock-pulse driver, phase inverter, and one-shot. A signal in the system which is at an arming or enabling level will be spoken of hereinafter as being up; when a signal is at a disarming level it will be spoken of as being down.

Figure 2:
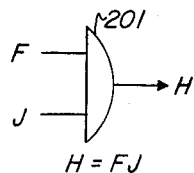
FIGURE 2 is a symbolic illustration of an AND gate together with its corresponding logic equation.
Figure 5:
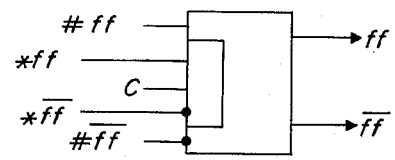
FIGURE 5 is a symbolic illustration of the flip-flop circuit of FIG. 4.

Shown in FIG. 2 is the symbol representative of an AND gate. An AND gate is a well-known logic element which produces an arming signal at its output terminal only when the signals applied to its plurality of input terminals are simultaneously at an arming level. Thus an output signal H of an AND gate 201 is up if each of a pair of signals F and J applied to its input terminals is up, but is down if either of the signals F or J is down. For convenience and clarity and to simplify the drawings extensive use of the logic equations will be made as illustrative of the logic circuitry. The usual convention of the indicated product for the AND function will be employed. Thus the equation $H = FJ$ in FIG. 2 is illustrative of the AND gate 201 equally as well as the symbol shown. (A suitable embodiment of an AND gate is shown in FIG. 5 in a U.S. patent application 8,391, filed February 12, 1960, by R. R. Johnson for a Data Processing System, and assigned to the same assignee as the present invention.) Certain AND gates used in the circuits of the present invention are required to produce an output pulse in response to a gated input pulse. Such gates are used in logic circuits which are connected to the # input terminals of the register flip-flops as will be explained more fully hereinafter. (A suitable embodiment of a pulse AND gate is shown in FIG. 10 of the above-mentioned patent application Serial No. 8,391 wherein it is designated a "Register Transfer" circuit.)

Figure 3:
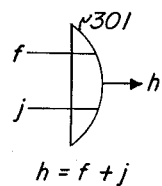
FIGURE 3 is a symbolic illustration of an OR gate together with its corresponding logic equation.
Figure 6:
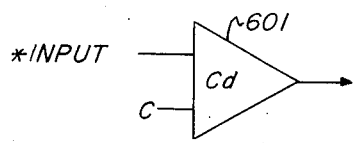
FIGURE 6 is a symbolic illustration of a clock pulse driver circuit.

A symbol of an OR gate 301 and the corresponding logic equation is shown in FIG. 3. An OR gate is a well-known circuit which produces an output signal in response to an input signal at any one or more of its several input terminals. The usual convention of a plus sign for the inclusive OR function will be used. Thus the equation $h=f+j$, which represents the gate 301, indicates that the signal $h$ will be up if either of the signals $f$ or $j$ is up or if both are up. (A suitable embodiment of an OR gate is shown in FIG. 6 of the above-mentioned U.S. patent application Serial No. 8,391.)

Figure 4:
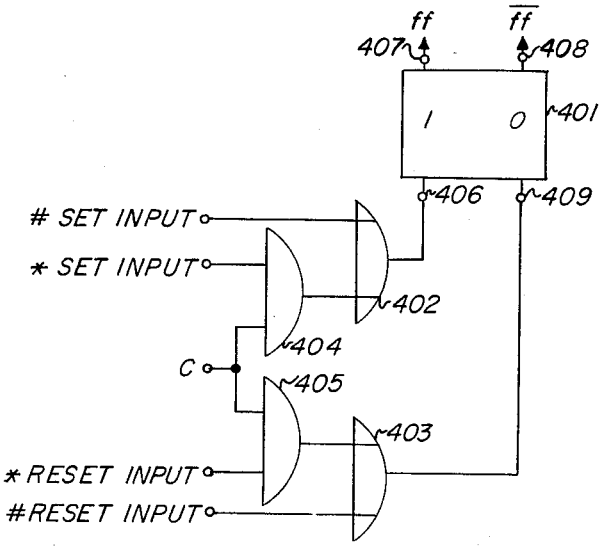
FIGURE 4 is a block diagram of a flip-flop circuit.

Shown in FIG. 4 is an example of a flip-flop circuit. The flip-flop is a well-known circuit which provides temporary storage of a binary bit or provides storage of a control signal. The flip-flop comprises a bistable device 401, a pair of OR gates 402 and 403, and a pair of AND gates 404 and 405. The bistable device 401 is capable of either of two stable states of operation. Thus it may assume a "1" representing or set state or a "0" representing or reset state. The bistable device 401 assumes its set state in response to a pulse applied to a set input terminal 406. In its set state the bistable circuit 401 produces a signal $ff$ at a set output terminal 407 which is up or at an arming level and a signal $\overline{ff}$ at a reset output terminal 408 which is down or at a disarming level.

The bistable circuit 401 assumes its reset state when a signal is applied to a reset input terminal 409. When the bistable circuit 401 is in its reset state the signal $\overline{ff}$ is up and the signal $ff$ is down. It is to be noted that the output signals $ff$ and $\overline{ff}$ are complementary, that is, when one is up the other is down.

Signal terms which are preceded by an "*" or a "#" are input signals, ordinarily, from logic circuits. The flip-flop circuit of FIG. 4 is adapted to receive five different input signals: a # set input signal, an * set input signal, a clock pulse signal C, an * reset input signal, and a # reset input signal. If the * set input signal is up on the occurrence of the clock pulse C the gate 404 produces a pulse which is passed by the gate 402 and applied to the set input terminal 406 of the bistable circuit 401 thus triggering the circuit to its set state. Similarly if the * reset input signal is up on the occurrence of the clock pulse C the AND gate 405 produces a pulse which is applied to an input terminal of the OR gate 403 which in turn produces a reset signal at the reset terminal 409 which causes the bistable circuit 401 to assume its reset state. The # input signals are ordinarily pulses which have been produced by externally clocked logic circuitry.

A symbolic representation of the flip-flop circuit of FIG. 4 is shown in FIG. 5 and this symbol will be employed to represent the register flip-flops and the control flip-flops hereinafter. (An embodiment of a flip-flop circuit is shown in FIG. 4 of the aforementioned U.S. patent application Serial No. 8,391.)

A symbolic representation of a clock pulse driver circuit is shown in FIG. 6 as a clock pulse driver 601. The clock pulse driver produces clock pulse signals to drive other clock pulse drivers or for application to the clock pulse input terminal of flip-flops and to pulse logic circuits for controlling the entry of data into flip-flops and the transfer of data between the flip-flops of registers. The clock pulse driver responds to an input clock pulse C to produce or generate corresponding output clock pulses. The operation of a clock pulse driver is controlled by an * input signal, ordinarily the output signal of a logic circuit. When this signal is up on the occurrence of an input clock pulse C an output clock pulse is produced. When this signal is down the circuit is inhibited. (A suitable embodiment of the clock pulse driver is shown in FIG. 3 of the above-mentioned U.S. patent application Serial No. 8,391.)

Figure 7:
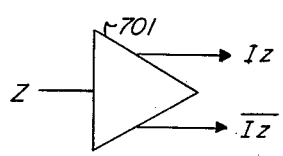
FIGURE 7 is a symbolic illustration of an amplifier-inverter for producing complementary output signals.

Shown in FIG. 7 is a symbolic representation of an inverter circuit 701. Such a circuit is used to produce complementary arming and disarming levels of an input signal. Thus if a signal Z is applied to the input terminal of the inverter circuit a pair of output signals Iz and $\overline{Iz}$ are produced, the signal Iz being the inverted version of the signal Z. In other words, if the signal Z is up the signal Iz is down and the signal $\overline{Iz}$ is up. If the input signal Z is down the signal Iz is up and the signal $\overline{Iz}$ is down. (A suitable embodiment of an inverter circuit shown in FIG. 7 of the above-mentioned patent application Serial No. 8,391.)

Figure 8:
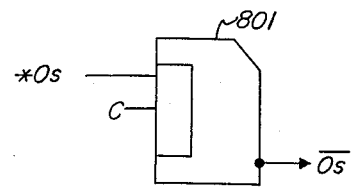
FIGURE 8 is a symbolic illustration of a monostable or one-shot circuit.

Another basic circuit used in the present invention is the well-known one-shot circuit. The symbolic representation of a one-shot circuit 801 is shown in FIG. 8. The one-shot is a circuit having stable and astable states of operation. A positive input pulse triggers the one-shot circuit to its astable state in which it remains for a predetermined designed time after which it returns to its stable state. The one-shot circuit is useful in timing various operations of computer circuits. In the one-shot circuit shown in FIG. 8 when an input signal $*Os$ is up or at an arming level upon the occurrence of a clock pulse C, the one-shot is triggered to its astable state in which state an output signal $\overline{Os}$ is down or at a disarming level. (A suitable embodiment of a one-shot circuit is shown in FIG. 11 of the above-mentioned patent application Serial No. 8,391.)

Since the logic circuits of the system of the invention are to a great extent shown in symbolic and logic equation form it is appropriate at this point to clearly define the terminology used. It is also pointed out that while logic equations are employed herein to define the logic structures of the system it is known in the art that such logic equations define the structure to the same extent as block diagrams of such logic structure. For example a logic equation $*\overline{D13}=D13\ Ss+Sp\ \overline{Ss}$ (see FIG. 36) illustrates a logic circuit which comprises a first AND gate which receives the signals D13 and Ss, a second AND gate which receives the signals Sp and $\overline{Ss}$ and an OR gate which receives the output signals from the first and second AND gates and produces the signal $*\overline{D13}$ (the * reset input signal to a flip-flop circuit). For convenience a mnemonic terminology has been adopted consisting of one or more letters. Only the first letter of a signal designation is capitalized. For example term $Cab$ is the output signal of a comparison circuit for comparing the contents of A and B registers.

Before proceeding to a description of the details of the elements of the system the signals which are used and developed in the system will be defined. For convenience and ready reference the signal definitions are listed below in the alphabetical order of the signal designations. The number of the figure in which the circuit of origin of the signal is shown is also given.

*Signal Definitions*

A1 . . . A5, $\overline{A1}$ . . . $\overline{A5}$: These are the respective set and reset output signals from the flip-flops or stages of the A-register (FIG. 11). The A-register contains the binary coded representation of the current phoneme received from the encoder.

B1 . . . B5, $\overline{B1}$ . . . $\overline{B5}$: These are the respective set and reset output signals from the stages of the B-register (FIG. 12). The B-register contains the binary coded representation of the previous phoneme which was in the A-register at the last sample time.

$Cab$: This is a comparison signal from the comparison circuit C-1 (FIG. 13). This signal is up when the encoded phonemes in A and B registers are the same.

$\overline{Car}$: This is a comparison output signal from the comparison circuit C-2 (FIG. 14). This signal is up when the encoded phonemes in the A-register and the first five stages of the R-register are different.

Cdo: This is an output signal from a clock pulse driver circuit Cd-5 (FIG. 29). This signal causes a serial shift in the Or-register. This serial shift enables the output register to receive the word designator from the memory during normal signal recognition operation and provides a word designator for recording in the memory during a Load operation.

Cdp: This is the output signal from a clock pulse driver circuit Cd-2 (FIG. 29). This signal causes a bit-parallel, character-serial shift of the R-register when the encoded phonemes are being assembled therein.

Cds: This is an output signal from a clock pulse driver circuit Cd-3 (FIG. 29). This signal causes a completely serial shift of the R-register when the phoneme sequence assembled therein is compared with the stored phoneme sequences in the memory and during a Load operation for recording the phoneme sequence in the memory.

Cdt: This is an output signal from a clock pulse driver circuit Cd-4 (FIG. 29). This signal causes a track counter (D-13 . . . D-16) to count once for every revolution of the drum.

Cd1: This is an output signal from a clock pulse driver circuit Cd-1 (FIG. 29). This signal causes a sector counter (D-7 . . . D-12) to count once every drum word or sector time.

Cmr: This is a signal from a logic gating circuit which may be used to indicate to external equipment that comparison was found between the contents of the R-register and phoneme part of the drum word or sector last read from the memory (FIG. 38).

Cp: This signal is the bit clock pulse which originates from a clock track on the drum of the memory unit. It occurs at intervals of substantially four microseconds (FIG. 28).

Figure 46:
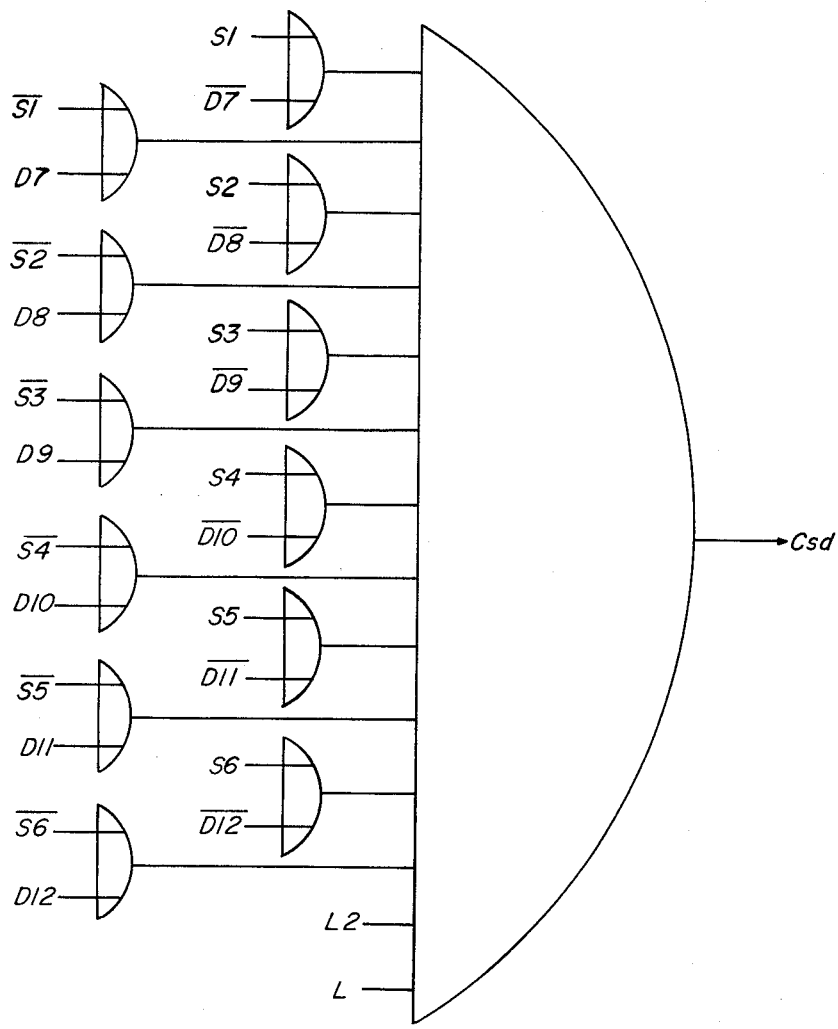
FIGURE 46 illustrates a logic circuit for producing a sector address comparison signal during a Load operation.

Csd: This is the output signal from a sector address comparison circuit (FIG. 46). This signal indicates a comparison between a set of switches S-1 . . . S-6 and the sector counter (D-7 . . . D-12). When this comparison is found the next sector to pass under the writing head is the one in which the contents of R-register and the Or-register are to be written during a Load operation.

Ct: This is an output signal from a logic circuit which receives signals from an address counter (FIG. 30). Each track on the drum memory contains 40 sectors each having fifty bit positions designated $t1 \ldots t50$. The signal Ct is up during $t46$ time of sector 40. Among other things the signal Ct arms a circuit for counting the track counter (D-13 . . . D-16).

D1 . . . D6, $\overline{D1}$ . . . $\overline{D6}$: These are the set and reset output signals respectively of the stages D-1 . . . D-6 of a D-counter of the memory unit which form a six-stage bit counter (FIG. 31). These signals are applied to logic gating circuits for producing enabling or arming signals at predetermined bit times.

Figure 32:
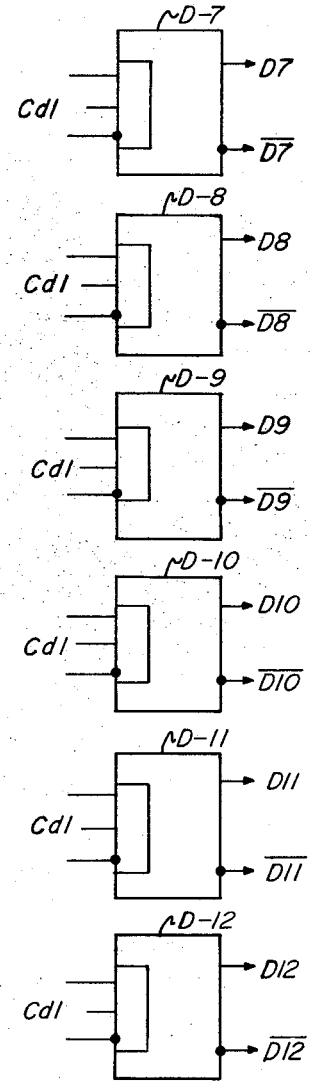
FIGURE 32 illustrates a six-stage sector counter with the input logic circuits thereof shown in logic equation form.

D7 . . . D12, $\overline{D7}$ . . . $\overline{D12}$: These signals are the respective set and reset output signals from the stages D-7 . . . D-12 of the D-counter which form a six-stage sector counter (FIG. 32). In the illustrated embodiment of the invention there are 40 sectors in each track.

D13 . . . D16, $\overline{D13}$ . . . $\overline{D16}$: These are the respective set and reset output signals from the stages D-13 . . . D-16 of the D-counter which form a four stage track counter (FIG. 35). Logic levels derived from these signals switch the reading and writing circuits among the drum tracks. In the illustrative embodiment of the invention there are 13 tracks.

D17, $\overline{D17}$: These are respective set and reset output signals of the D-17 stage of the D-counter which forms a one stage drum revolution counter (FIG. 36). The magnetic drum of the illustrated memory makes one revolution substantially every 10 milliseconds. The stage D-17 is used to count down the drum revolutions by a factor of 2 for generating a sample signal T1 every 20 milliseconds.

Iywp: This is the output signal of an inverter circuit (FIG. 21). This signal is used to clear the B-register and the R-register at the start of each spoken word. It is also used to control the generation of the clock pulse Cdp.

Km: This is a signal from a push-button which initiates the loading of a new phoneme sequence word into the memory by setting a flip-flop L-1 (FIG. 41).

K$sd$13 . . . K$sd$16, K$rd$13 . . . K$rd$16: These are the the output signals from a set of switches of a track selection circuit (FIG. 43). These signals select the track in which a new word is recorded during loading of the memory.

K$sor$1 . . . K$sor$11, K$ror$1 . . . K$ror$11: These are output signals from a set of switches of a word designator selection circuit (FIG. 45). These signals represent the word designator which is recorded in the memory together with a new word.

Figure 34:
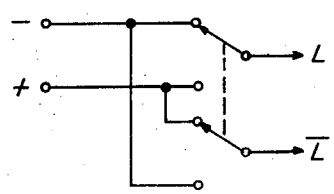
FIGURE 34 illustrates a double-pole, double-throw, Load-Operate switch.

L, $\overline{L}$: These are signals from a Load-Operate switch which conditions the circuits of the system for normal signal recognition operation ($\overline{L}$ up) or for loading new phoneme words into the memory (L up) (FIG. 34).

L1, $\overline{L1}$: These are respective set and reset output signals from a Load operation initiating flip-flop L-1 which stores the load signal K$m$ until the timing of the system is correct for the Load operation to begin (FIG. 41).

L2, $\overline{L2}$: These are respective set and reset output signals from a load control flip-flop L-2 (FIG. 42). These signals enable the system for writing the encoded phoneme sequence of a new word into the memory.

M, $\overline{M}$: These are respective set and reset output signals of a read output circuit flip-flop M-1 which receives signals read from the drum (FIG. 28).

Mer, $\overline{Mer}$: These are respective set and reset output signals from a flip-flop Mer-1 for indicating when a comparison is found between the contents of R-register and a phoneme sequence read from the drum (FIG. 37). During the memory search the flip-flop Mer-1 is triggered to its set state every $t50$ time. During the scanning of the next sector the stage Mer-1 is triggered so that Mer goes down upon the occurrence of the first pair of phoneme bits which fail to compare. If the signal Mer is still up at some $t46$ time this means that the phoneme sequence of the corresponding sector is the same as the phoneme sequence to be recognized which is being circulated in the R-register.

Op, $\overline{Op}$: These are the output signals of an origin pulse inverter-amplifier which receives signals from a read head adjacent an origin track of the magnetic drum (FIG. 28). The Op pulse is up for one clock time ($t50$) each drum revolution and it is used to synchronize the bit and sector counters (D-1 . . . D-12 of the D-counter).

Or1 . . . Or11, $\overline{Or1}$ . . . $\overline{Or11}$: These are respective set and reset output signals from the Or-register stages Or-1 . . . Or-11 (FIG. 40). The Or-register accepts the word designator which is read from the memory immediately following a successful comparison between a phoneme sequence stored in the memory and the phoneme sequence being circulated in the R-register. In the Load mode of operation the Or-register receives the word designator corresponding to the new word for recording in the memory.

P1 . . . P3, $\overline{P1}$ . . . $\overline{P3}$: These are respective set and reset output signals from a three stage binary "presence counter" designated a P-counter (FIG. 15). The P-counter is part of a circuit for detecting the start of a spoken word and for distinguishing between significant silence during a word and silence indicating the end of a word.

Ph: This is the output signal of a logic circuit which receives signals from the stages of A-register (FIG. 17).

The signal P$h$ is up to indicate the presence of a non-silent phoneme whenever any one of the stages of the A-register is in its set state.

R1 . . . R35, $\overline{R1}$ . . . $\overline{R35}$: These are the respective set and reset output signals from the stages of the R-register (FIGS. 25 and 27). The R-register provides a storage for the phonemes as they are received and accepted. The R-register is then serially shifted for comparison of the phoneme sequence contained therein with the stored phoneme sequences in the memory.

S1 . . . S6, $\overline{S1}$ . . . $\overline{S6}$: These signals are provided by a group of switches which are set to the representation of a drum sector address at which a new phoneme sequence is to be recorded on the drum during a Load operation (FIG. 44).

S$i$: This signal is the output signal of a logic circuit which detects silence (FIG. 17). The signal S$i$ is up when all the stages of A-register are in the reset state and one or more of the stages of the P-counter is in the reset state.

S$p$, $\overline{Sp}$: These are respective set and reset output signals from a "search period" flip-flop S$p$-1 which stores an indication that the spoken word has ended (FIG. 23).

S$s$, $\overline{Ss}$: These are respective set and reset output signals from a "serial shift" flip-flop S$s$-1 which enables the serial shift of the R-register (FIG. 24).

Figure 33:
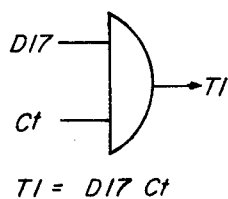
FIGURE 33 is a diagram of a logic circuit which developes a phoneme sampling pulse.

T1: This signal is the phoneme sample signal which is up for one clock period at the $t46$ time of sector 40 every other revolution of the drum, that is, every 20 milliseconds (FIG. 33). The signal T1 controls the comparisons and transfers among the A, B and R registers.

($t1$ . . . $t35$): This is a parenthetical timing term which represents a signal which is up during the bit times $t1$ . . . $t35$ of every sector. This time corresponds to the phoneme part of the drum word stored in the sector. This signal is the output signal of a logic circuit illustrated in logic equation form in FIG. 30.

($t36$ . . . $t46$): This parenthetical timing term represents a signal which is up during the bit times $t36$ . . . $t46$ of every sector. This time corresponds to the word designator part of the drum word stored in the sector. This signal is the output signal of a logic circuit illustrated in FIG. 30.

($t46$): This parenthetical timing term represents a signal which is up during bit time $t46$. It is used for various control purposes. This signal is the output signal of a logic circuit illustrated in FIG. 30.

($t47$ . . . $t50$): This parenthetical term represents a signal which indicates a space time of four bits during which no meaningful information can be read from the drum. This signal is the output signal of a logic circuit illustrated in FIG. 30.

($t50$): This parenthetical timing term represents a signal which is up during bit time $t50$, the last bit of each sector. It is used to condition the M$er$-1 flip-flop to begin phoneme comparison and to cause the write circuits to write a "1" in the $t50$ bit position. This signal is the output signal of a logic circuit illustrated in FIG. 30.

U$s$: This signal is the output signal of a gating circuit which senses for an unsuccessful search of the memory (FIG. 39). An unsuccessful search is indicated by the fact that the signal S$s$ of the serial shift flip-flop is still up at time $t46$ of the last sector (sector 40, track 13). In addition to its use as a logic signal the signal U$s$ may be employed by external equipment to indicate to the operator that a spoken word was not identified.

V0 . . . V31: These are the phoneme signals received by the encoder of the system from the phoneme detector over 32 separate lines (FIG. 9). These signals are mutually exclusive, that is, only one can be up at any given time.

W$a$, $\overline{Wa}$: These signals are the complementary information input signals to the write circuits of the memory unit (FIG. 28).

W$a'$: This signal is the enable signal for the writing circuits of the memory unit (FIG. 28).

W$e$: This is the output signal of a gating circuit which receives signals from the P-counter and the word present flip-flop (FIG. 18). The signal W$e$ indicates that a spoken word has ended.

W$p$, $\overline{Wp}$: These are respective set and reset output signals of a "word present" flip-flop W$p$-1 (FIG. 22). The signal W$p$ is up to indicate that a spoken word is in progress.

W$s$, $\overline{Ws}$: These are respective set and reset output signals from a "word start" flip-flop W$s$-1 (FIG. 16). The signal W$s$ is up to indicate the start of a spoken word.

X11 . . . X52: These are the output signals of an encoding circuit for encoding the phoneme signals V0 . . . V31 for entry into the A-register (FIG. 10).

$\overline{Ywp}$: This is the output signal of a one-shot Y$wp$-1 which is triggered at the start of each spoken word and has an astable period of about 40 microseconds (ten clock periods) (FIG. 20). This signal is used to derive the signal 1$ywp$ for clearing the B-register and R-register.

The elements of the system and their inter-relationships will now be more specifically described:

Encoder

The purpose of the encoder circuit is to receive phoneme signals from the phoneme detector and to convert each of these signals to a five-bit binary character for entry into the A-register. In the illustrated embodiment of the invention, thirty-two separate lines connect the phoneme detector to the input terminals of the encoder (FIG. 1). Ten separate output terminals of the encoder are connected by ten separate lines to respective set and reset input terminals of the five stages or flip-flops of the A-register. Shown in FIG. 9 is a chart which illustrates the binary coded characters received by the A-register corresponding to each of the thirty-two phoneme signals V0–V31. The phoneme signals V0–V31 are mutually exclusive, that is, only one of these signals can be up at any given time.

The circuit of the encoder 103 (FIG. 1) is shown in FIG. 10 in logic equation form. The encoder circuit of FIG. 10 provides respective set and reset signals to each of the stages of the A-register. For example, a signal X11 is a signal from the encoder to a set input terminal of the stage A-1 of the A-register. Similarly, a signal X12 is applied to a reset input terminal of stage A-1 of A-register as is shown in FIG. 11 which is a diagram of the A-register circuit. The circuit of the encoder illustrated in FIG. 10 is shown in logic equation form for greater clarity and to reduce the extent and complexity of the drawings. As is well known in the art the logic equation representation of a circuit is entirely equivalent to a symbolic representation of a circuit and in fact the logic equation form of representation is often more readily comprehended. Thus each of the output signals of the encoder X11, X12, X21, X22, X31, X32, X41, X42, X51 and X52 is the output signal from a logic OR circuit or gate which has applied to its input terminals an appropriate combination of the phoneme signals V0–V31 whereby the coding, as indicated in FIG. 9, is achieved. For example, the signal X11 is the output signal of an OR gate (or a combination of OR gates) which has the signals V1, V3, V5, V7, V9, V11, V13, V15, V17, V19, V21, V23, V25, V27, V29 and V31 applied to its input terminals. Each of the encoder output signals X11–X52 is applied to a respective * input terminal of a stage or flip-flop of the A-register as shown in FIG. 11.

A-Register

The purpose of the A-register is to store the encoded phoneme signals received from the encoder for comparison with the encoded phonemes stored in the B-register and R-register and for transfer to the R-register if the comparison tests are met. The A-register comprises five flip-flops A–1 . . . A–5 (FIG. 11). Each of these flip-flops is similar to the flip-flop circuit described in connection with FIGS. 4 and 5.

The signals from the encoder are applied to the * input terminals of the flip-flops. The clock signal $Cp$ is applied to the clock pulse input terminals of the flip-flops, it being recalled that the signal $Cp$ is the basic clock pulse of the system derived from the clock track on the magnetic drum of the storage unit of FIG. 28. The input signal circuits to the flip-flops are represented by logic equations. For example, the equation $*A1=X11$ indicates that the signal X11 is applied to the * set input terminal of flip-flop A–1. When the signal X11 is up upon the occurrence of the clock pulse $Cp$, the set input of the flip-flop A–1 is triggered and the flip-flop assumes its set state with the output set signal A1 up and the reset output signal $\overline{A1}$ down. Similarly the equation $*\overline{A1}=X12$ indicates the input to the * reset input terminal of the flip-flop A–1. Thus when the signal X12 is up upon the occurrence of the clock pulse $Cp$, the flip-flop A–1 is triggered to its reset state with its reset output signal $\overline{A1}$ up and its set output signal A1 down. The output terminals of the A-register are connected to the input terminals of the comparison circuits C–1 and C–2 and the transfer circuits 111 and 117 (FIG. 1). As mentioned hereinbefore the comparison circuit C–1 compares the content of A and B registers under control of the sample signal T1. The sample signal also enables the transfer circuit 111 (FIG. 1) whereby the encoded phoneme in A-register is transferred to B-register where it is then available for comparison with a new phoneme at the next sample time, that is, upon the occurrence of the next sample signal T1. The circuit 111 of FIG. 1 is a symbolic representation of the input logic gating circuitry to the B-register.

*B-Register*

The circuit of the B-register is shown in FIG. 12. The purpose of the B-register is to store an encoded phoneme so that it may be subsequently compared to an encoded phoneme received by the A-register. The content of A and B registers can then be compared to determine whether the phoneme representation received by A-register has persisted for more than one sample period (a sample period being the time between successive sample signals). The B-register comprises five flip-flops B–1 . . . B–5. These flip-flops are similar to the flip-flop discussed in connection with FIGS. 4 and 5 above.

The logic gating circuitry connected to the input terminals of the flip-flops of B-register is shown in FIG. 12 in logic equation form. As mentioned above, the gating circuitry represented by these logic equations is represented collectively in FIG. 1 as the transfer circuit 111. This input logic structure is comprised of combinations of AND and OR gates as is clearly illustrated by the logic equations. For example, the equation $*B1=A1\ T1\ \overline{Ywp}$ represents an AND gate which produces the set input signal $*B1$ in response to simultaneous arming levels of the signals A1, T1, and $\overline{Ywp}$ applied to its input terminals. Similarly the equation $*\overline{B1}=\overline{A1}\ T1+Iywp$ is a representation of the gating circuitry connected to the * reset input terminal of the flip-flop B–1. This equation indicates that the signals $\overline{A1}$ and T1 are applied to respective inputs of an AND gate the output of which is applied to an OR gate that has the signal $Iywp$ applied to its other input terminal. The output signal of the OR gate is of course the reset input signal $*\overline{B1}$. The input logic circuits of the other flip-flops of the B-register are similar.

Applied to each of the flip-flops B–1 . . . B–5 of the B-register is the basic machine clock pulse $Cp$. Thus for example if the signals A1, T1 and $\overline{Ywp}$ are all up on the occurrence of the clock pulse $Cp$ the stage B–1 will be triggered to its set state with its set output signal B1 up and its reset output signal $\overline{B1}$ down.

As has been mentioned above the purpose of the B-register is to receive and store the phoneme representation from the A-register every sample time so that it may be compared with the phoneme signal next received by the A-register. The input logic gating circuitry of B-register as represented in FIG. 1 by the transfer circuit 111 is arranged to accomplish this purpose. For example, as mentioned above if the signals A1, T1, and $\overline{Ywp}$ are all up upon the occurrence of a clock pulse $Cp$, the stage B–1 will be triggered to its set state. The signal A1 is up when the stage A–1 of A-register is in its set state. As mentioned hereinbefore, the signal T1 is the sample signal which defines the sample times. The signal T1 occurs once every other revolution of the drum of the memory unit, that is, once every 20 milliseconds. The signal $\overline{Ywp}$ is the output signal from a control one-shot (FIG. 20) which is in its astable state for approximately ten clock periods at the beginning of a word. Thus the signal $\overline{Ywp}$ is normally up or at an arming level. Thus it can be seen that if the signal A1 is up indicating the set state of the stage A1 of A-register, the stage B1 of B-register will be triggered to its set state upon the occurrence of the clock pulse $Cp$. In this way the stage B–1 is set to the same information representing state as the stage A–1.

Similarly if the stage A–1 of A-register is in its reset state the stage B–1 of B-register will assume its reset state. This is accomplished by the circuit represented by the equation $*\overline{B1}=\overline{A1}\ T1+Iywp$ which is connected to the * reset input terminal of the flip-flop B–1. Thus the input signals which cause stage B–1 to assume its reset state may be stated logically as $\overline{A1}$ AND T1 OR $Iywp$. Thus if $\overline{A1}$ and T1 are up on the occurrence of the clock pulse $Cp$ the stage B–1 will be triggered to its reset state; or if the signal $Iywp$ is up upon the occurrence of the clock pulse $Cp$ the stage B–1 will be triggered to its reset state. The signal $\overline{A1}$ is of course the reset output signal from the A–1 stage of A-register. This signal is up when the flip-flop A–1 is in its reset state. The signal $Iywp$ is a clearance signal which is up for ten clock periods at the beginning of a word. By means of this signal the B-register is cleared, that is, each flip-flop thereof is triggered to its reset state at the beginning of each word.

The set and reset output terminals of the flip-flops of B-register are connected to respective input terminals of a comparison circuit represented in FIG. 1 by the comparison circuit C–1.

*Comparison Circuit C–1*

The comparison circuit C–1 is illustrated in FIG. 13. The circuit is also illustrated by the logic equation of the circuit which also appears in FIG. 13. From the diagram it is seen that the circuit comprises a series of OR gates, such as an OR gate 1301, having their output terminals connected to respective input terminals of an AND gate 1302, the output signal of which is the signal $Cab$. Thus the signal $Cab$ is normally down and will be up only when the output signals from all of the OR gates are up simultaneously. Of course for the output signal from an OR gate to be up one or more of the signals applied to its input terminals must be up. Thus gate 1301 will produce an arming level output signal if either of the signals A1 or $\overline{B1}$ is up. An examination of the logic equation for the signal $Cab$ reveals that a signal will be up only when corresponding stages of the A and B registers are in the same information representing state, that is, either set or reset. The signal $Cab$ is one of the enabling signals for a logic circuit indicated as the transfer circuit 117 in FIG. 1 which controls the transfer of the phoneme representation from A-register to the first five stages of R-register. Before such a transfer can be affected an enabling signal must also be received from the comparison circuit C–2 (FIG. 1).

*Comparison Circuit C–2*

The comparison circuit C–2 is shown in block diagram and logic equation form in FIG. 14. The circuit comprises a series of AND gates, such as an AND gate 1401, each having its output terminal connected to a respective input terminal of an OR gate 1402, the output signal of which is the comparison signal $\overline{Car}$. The comparison circuit receives set and reset output signals from the stages of A-register and set and reset output signals from the first five stages of R-register. Examination of the logic equation leads to the conclusion that the signal $\overline{Car}$ will be down, that is, at a disarming level, only when corresponding stages of the A-register and R-register are in the same information representing state, set or reset. In other words the signal $\overline{Car}$ is down only when the phoneme representation in the A-register is the same as the phoneme representation in the first five stages of the R-register. Conversely the signal $\overline{Car}$ is up, that is, at an arming level, whenever the A-register and the first five stages of the R-register are storing different encoded phonemes. Thus the comparison circuit C–2 detects the second condition necessary for the transfer of an encoded phoneme from the A-register to the first five stages of the R-register, namely, that the phonemes be different so that the circuit does not interpret a slowly spoken phoneme as two successive similar phonemes.

The transfer circuit 117 of FIG. 1 receives the set and reset output signals from the stages of the A-register and the enabling signals $Cab$ and $\overline{Car}$.

*R-Register (\* Input Circuits)*

Illustrated in FIG. 25 are the stages R–1 . . . R–5 of the R-register with the \* input circuits thereto illustrated in logic equation form. These input circuits are represented collectively in FIG. 1 by the transfer circuit 117. These input circuits receive the clock pulse $Cdp$ which is the output signal of the clock pulse driver $Cd$–2 shown in FIG. 29. (The five clock pulse driver circuits $Cd$–1 . . . $Cd$–5 shown in FIG. 29 are included in the Timing and Control circuit 124 of FIG. 1.) As is seen in FIG. 25 the clock pulse $Cdp$ is applied to the clock pulse input terminals of stages R–1 . . . R–5. The logic circuit connected to the arming input terminal of the clock pulse driver $Cd$–2 is shown in FIG. 29 in logic equation form.

Clock pulse driver $Cd$–2 produces its output signal $Cdp$ whenever the signal applied to its arming terminal is up upon the occurrence of the bit clock pulse $Cp$. This condition is met if all of the signals $Wp$, $Cab$, $\overline{Car}$, $\overline{R31}$, $\overline{R32}$, $\overline{R33}$, $\overline{R34}$, $\overline{R35}$ and T1 are simultaneously up or if the signal $Iywp$ is up.

The signal $Wp$ is the set output signal from the word present flip-flop of FIG. 22. The operation of this flip-flop will be discussed more fully hereinafter. It is sufficient for present purposes to state that the signal $Wp$ is up during the period when a word is being spoken, that is, when a sequence of phoneme signals is being received by the system. The signal $Cab$ is the output signal of the comparison circuit C–1 discussed above. Signal $Cab$ will be up if the A-register and B-register contain the same phoneme representation. The signal $\overline{Car}$ will be up whenever the A-register and the first five stages of R-register contain different phoneme representations. The signals $\overline{R31}$–$\overline{R35}$ are the reset output signals from the last five stages of R-register, that is, the stages of the last column of R-register. These signals appear in the equation to establish the condition that a transfer from A-register to the R-register will not take place if the R-register is filled, that is, a transfer occurs only if the signals $\overline{R31}$–$\overline{R35}$ are up indicating that corresponding stages of R-register are in the reset state. The signal T1 is the previously mentioned sample signal. When all of these conditions are met the clock pulse driver $Cd$–2 produces its output clock pulse $Cdp$. (It is noted that a clock pulse $Cdp$ is also produced when a signal $Iywp$ is up. This is for the purpose of clearing the R-register.)

Referring again to FIG. 25, the input logic gating circuit connected to the \* set input terminal of the stage R–1 is illustrated by the equation \*$R1=A1$ $Wp$ $\overline{Ywp}$. The signal $A1$ is up when the stage A–1 of A-register is in its set state. The signal $Wp$ is up when a sequence of phoneme signals is being received by the system. The signal $\overline{Ywp}$ is up except during the first ten clock periods at the start of a word. Thus if the conditions for generating the clock pulse $Cdp$ are met as discussed above, if the signals $Wp$ and $Ywp$ are up, and if the stage A–1 is in its set state the stage R–1 of R-register will be triggered to its set state.

The logic gating circuitry connected to the \* reset input terminal of stage R–1 is given by the equation \*$\overline{R1}=\overline{A1}$ $Wp+Iywp$. Thus if all the conditions are met and the stage A–1 is in its reset state, the stage R–1 is triggered to its reset state upon the occurrence of the clock pulse $Cdp$.

As mentioned hereinbefore the signal $Iywp$ is a clear signal which is up for the first ten clock periods at the beginning of a word or received phoneme sequence. The signal $Iywp$ is applied to the arming terminal of the clock pulse driver $Cd$–2 of FIG. 29 whereby a clock pulse signal $Cdp$ is produced. The signal $Iywp$ also arms the \* reset input terminals of the stages R–1 . . . R–5 so that upon the occurrence of the clock pulse $Cdp$ these stages are reset.

By way of summary it may be stated that the phoneme representation stored in A-register will be transferred to the first five stages of R-register if the following conditions are met: The phoneme representations in A and B registers are the same, as represented by the arming level of the comparison signal $Cab$; the phoneme representations in A-register and the first five stages of R-register are different as represented by the arming level of comparison signal $\overline{Car}$; the R-register has not been filled as indicated by the arming level of signals $\overline{R31}$–$\overline{R35}$; a phoneme sequence is being received as indicated by the arming level of signal $Wp$; and a clearance cycle is not in progress as indicated by the arming level of signal $\overline{Ywp}$.

The signals $Wp$, $\overline{Ywp}$, and $Iywp$ are output signals from control circuits which detect the presence of a word, that is, an incoming sequence of phoneme signals.

*Control Circuits*

Control circuits for detecting the beginning and end of a sequence of phoneme signals, for distinguishing between significant silence and the end of a sequence of phoneme signals, and for controlling the sampling of the phoneme signals are shown in FIGS. 15–24. (These circuits are included in the Timing and Control circuit 124 of FIG. 1.)

Illustrated in FIG. 15 is a presence or P-counter. The P-counter comprises three flip-flop circuits P–1 . . . P–3, each of which is similar to the flip-flop circuit described hereinbefore in connection with FIGS. 4 and 5. The P-counter counts in straight binary fashion. Thus after the receipt of seven input counting signals each of the stages is in its set state. The purpose of the P-counter is to distinguish between significant silence which may occur within a word and silence which indicates the end of a word or sequence of received phoneme signals. The input logic gating circuits of the P-counter are shown in FIG. 15 in logic equation form. As may be seen from these equations the flip-flops P–1 . . . P–3 are triggered upon the sample signal T1 which as mentioned hereinbefore occurs every 20 milliseconds. The counting of the P-counter is initiated by the signal $Si$. When this signal is up the P-counter is advanced one count upon the occurrence of each sample signal T1.

As is shown in the encoding chart of FIG. 9 the phoneme signal V0 is the phoneme signal for silence and upon receipt of this silence signal each of the stages A–1 . . . A–5 of the A-register is triggered to its reset or "0" state. The logic gating circuit for producing the silence signal S$i$ is shown in FIG. 17 in logic equation form. As may be seen from this equation the silence signal S$i$ is up whenever all of the stages of the A-register are in their reset states as indicated by the arming level of the signals $\overline{A1}$–$\overline{A5}$ and and when one or more of the stages of the P-counter is in the reset state as indicated by the signals $\overline{P1}$–$\overline{P3}$. In other words, the P-counter will be advanced one count on each sample signal T1 whenever the A-register contains a silence representing signal and the P-counter is not in its seven representing state. In the present circuit arrangement silences which are less than 120 milliseconds are interpreted as significant silences while any silence which is longer than 140 milliseconds is considered as indicative of the end of a word. This interpretation is accomplished by the P-counter as follows: As mentioned above when the silence signal S$i$ is up the count in the P-counter advances one count upon the occurrence of each sample signal T1, the sample signals T1 occurring every 20 milliseconds. Assume for example that a silence signal is received by the A-register, thus resetting all of the stages of A-register, just after the occurrence of a sample signal T1. Thus by the time of occurrence of the next sample signal T1 the silence signal would have persisted for just less than 20 milliseconds. If the silence continues to persist, then after the occurrence of six pulses of the sample signal T1 the stage P–1 of the P-counter will be in its reset state. The stages P–2 and P–3 will be in their set state to thus indicate a count of six and the silence will then have persisted for about 120 milliseconds. If the silence continues to persist until the next sample signal T1 then the P-counter advances an additional count and all of the stages P–1 . . . P–3 are in the set state, with the signals $\overline{P1}$, $\overline{P2}$ and $\overline{P3}$ down or at a disarming level. The signal S$i$ therefore goes to a disarming level as may be seen from the equation in FIG. 17. This serves to lock the P-counter in its seven state with all of its stages set. This circuit arrangement prevents the counter from recycling during long periods of silence.

A logic gating circuit for producing the word end signal W$e$ is shown in FIG. 18. When the signals P1, P2, and P3 and W$p$ are up simultaneously the signal W$e$ is up. The signals P1, P2, and P3 will all be up as described above when the P-counter reaches its seven count, that is, when the silence has persisted for 140 milliseconds or more. The word present signal W$p$ is the set output signal from the word present flip-flop shown in FIG. 22. The signal W$p$ is up when a word or sequence of phoneme signals is being received as will be explained more fully hereinafter. As shown in FIG. 22 the word end signal W$e$ is applied to the * reset input terminal of the word present flip-flop and in this way the word present flip-flop is reset to store an indication of the end of a word.

Suppose, however, that a silence of less than 120 milliseconds, that is, a significant silence, occurs. For purposes of illustration assume that the silence has persisted during the occurrence of six successive sample signals T1. Since the P-counter advances one count for each sample signal the state of the counter will be P–1 reset and stages P–2 and P–3 set. Assume now that before the occurrence of the next sample pulse T1 the A-register receives a non-silent phoneme signal. In this event one or more of the A-register stages will be in its set state. Thus one or more of the reset output signals $\overline{A1}$–$\overline{A5}$ of the A-register will be down and therefore the silent signal S$i$ will be down thus disabling the counting input circuits (*P1 and *$\overline{P1}$) of the P-counter.

It will be noted that there is a P$h$ T1 input circuit connected to the * reset input terminal of each stage of the P-counter. The logic circuit for developing the signal P$h$ is shown in FIG. 17 in logic equation form. The signal P$h$ will be up whenever any one or more of the set output signals A1–A5 of A-register is at an arming level. This condition can obtain only when the A-register is storing a non-silent phoneme. Thus at any time that the A-register is storing a non-silent phoneme during the occurrence of the sample signal T1 the stages of the P-counter will be reset, that is, the P-counter will be cleared and ready to detect a subsequent period of silence.

The sample control circuitry must also provide a signal for indicating the start of a word or sequence of phoneme signals. This is achieved by providing the flip-flop W$s$–1 shown in FIG. 16. The input circuits to the word start flip-flop are shown in FIG. 16 in logic equation form. The flip-flop W$s$–1 is triggered to its set state to store an indication of the start of a word whenever the signals P$h$ and $\overline{Wp}$ applied to its * set input terminal are up or at an arming level upon the occurrence of the clock pulse C$p$. The signal $\overline{Wp}$ is the reset output signal from the word present flip-flop shown in FIG. 22. As described above this flip-flop is reset at the end of each word and thus the signal $\overline{Wp}$ is up at the beginning of the next word. Also as mentioned above the signal P$h$ is up, as shown by the logic equation thereof in FIG. 17, whenever the A-register contains a non-silent phoneme signal. When the flip-flop W$s$–1 is in its set state its set output signal W$s$ is up and its reset output signal $\overline{Ws}$ is down.

The word-start signal W$s$ is applied to a logic circuit connected to the * set input of the word period flip-flop W$p$–1 of FIG. 22. As shown in FIG. 22 arming levels of the signals $\overline{Ss}$ and $\overline{Sp}$ are also required before the word present flip-flop is triggered to its set state. The generation of the signals $\overline{Ss}$ and $\overline{Sp}$ will be discussed hereinafter. For the moment it is assumed that these signals are at an arming level and therefore the word present flip-flop W$p$–1 will be triggered to its set state upon the occurrence of the clock pulse C$p$ when the word start signal W$s$ is at an arming level. When the word present flip-flop W$p$–1 is in its set state its set output signal W$p$ is up. The signal W$p$ is applied to the * reset input terminal of the word start flip-flop W$s$–1. Thus the following clock pulse C$p$ resets the word start flip-flop W$s$–1. The action just described is also shown in the partial timing diagram of FIG. 19.

Provision must also be made for clearing the stages of the B-register and the R-register at the start of each word or new phoneme sequence as mentioned hereinbefore. This is accomplished by the one-shot Y$wp$–1 shown in FIG. 20 and an associated inverter circuit shown in FIG. 21. (The one-shot of FIG. 20 is similar to the one-shot circuit discussed in connection with FIG. 8.) The logic circuit connected to the * input terminal of the one-shot Y$wp$–1 is shown in FIG. 20 in logic equation form. The one-shot is triggered to its astable state whenever the signals W$s$ and W$p$ are up upon the occurrence of the clock pulse C$p$. As shown in the timing diagram of FIG. 19 the signals W$s$, W$p$ are up simultaneously for one clock period at the beginning of a word or new phoneme sequence. The output signal $\overline{Ywp}$ of the one-shot Y$wp$–1 is normally up but when the one-shot is in its astable state the signal $\overline{Ywp}$ is down for the period of the astable state. The signal $\overline{Ywp}$ is applied to the input terminal of the well-known inverter circuit shown symbolically in FIG. 21. The inverter circuit produces an output signal I$ywp$ which is up when the signal $\overline{Ywp}$ is down. The signal I$ywp$ is applied to the input circuits of the B-register and the stages R–1 . . . R–5 of the R-register for clearing these registers as discussed hereinbefore.

It will be recalled that after the sequence of phonemes has been assembled in the R-register a search is then made to find the corresponding phoneme sequence in the memory. To initiate this search operation there is provided a search period flip-flop S$p$–1 shown in FIG. 23. The search is, of course, initiated at the end of a word after the phoneme sequence has been assembled in the R-register; therefore the word end signal W$e$ is applied to the * set input terminal of the search period flip-flop S$p$–1. As explained hereinbefore when the word ends the signal W$e$ assumes an arming level. Thus the search period flip-flop is triggered to its set state upon the occurrence of the next clock pulse C$p$ and in this state the set output signal S$p$ is up. (The search period flip-flop S$p$–1 is reset in response to the arming level of the signal C$t$.)

It will be recalled that the phoneme signals stored in the R-register and the phoneme signals stored in the memory are compared on a bit-by-bit basis. It is therefore necessary that the contents of the R-register recirculate once each drum word or sector time of the drum. To control the serial shift of the information in R-register the serial shift flip-flop S$s$–1 shown in FIG. 24 is provided. The arming level of the signal S$p$ partially enables the set input circuit of the S$s$–1 flip-flop. The other condition required for setting this flip-flop is that the signal C$t$ be at an arming level. As defined hereinbefore, the signal C$t$ is up during the bit time $t46$ of sector 40. This is the last sector of each track. The serial shift flip-flop S$s$–1 is triggered to its set state at this time so that its set output signal S$s$ will be up to enable the serial shift of the R-register during the phoneme part of sector 1 (which is the fist part of the next sector to pass adjacent the reading head).

The logic gating circuit connected to the * reset input terminal of the serial shift flip-flop S$s$–1 is shown in logic equation form in FIG. 24. The flip-flop S$s$–1 will be reset if a successful search has been made as indicated by the signal term M$er$ ($t46$) or if the search of the memory has been unsuccessful as indicated by the signal U$s$. (The signal $\overline{L}$ is a signal from the Load-Operate switch which is up when the system is in the Operate mode.)

During a Load operation the search period flip-flop S$p$–1 of FIG. 23 is set at the end of a word as described hereinbefore and the arming level of the signal S$p$ causes the serial shift flip-flop S$s$–1 to be set upon the occurrence of the signal C$t$. However since the phonemes are not being compared during a Load operation the serial shift flip-flop S$s$–1 can not be reset as a result of such a search. Thus an alternatively way of resetting the serial shift flip-flop must be used. The structure which resets the serial shift flip-flop during a Load operation is illustrated by the second part of the reset input equation, namely, the signal term C$sd$ ($t46$). The signal C$sd$ is the output signal of the sector address comparison circuit of FIG. 46. It is up when the selected sector is located as described more fully hereinafter. The signal ($t46$) is the output signal of a logic circuit, illustrated in logic equation form in FIG. 30, which receives signals from the bit counter of FIG. 31. The signals C$sd$ and ($t46$) will be up at time $t46$ of the sector into which the new word is written to thereby arm the reset input terminal of the serial shift flip-flop S$s$–1.

R-Register (# Input Circuits)

The entire R-register is illustrated in FIG. 27 with its # input logic gating circuits shown in logic equation form. These # input circuits are transfer circuits between the stages of the register which enable the register to be shifted in two different modes, namely, a column-by-column mode during the assembly of the phoneme sequence and in a completely serial recirculating mode when the assembled phoneme sequence is being compared with the stored phoneme sequences in the memory or when the assembled phoneme sequence of a new word is being written into the memory.

For purposes of column-by-column shift an input circuit is provided to each stage for sensing the state of the adjacent stage in the next lower column. Thus during the column-by-column shift the state of stage R–1 is transferred to stage R–6, the state of R–2 is transferred to stage R–7 . . . the state of stage R–6 is transferred to stage R–11, the state of stage R–7 is transferred to stage R–12, and so forth. Thus during the column-by-column shift the phoneme representation stored in each column is transferred to the next column. This is accomplished by logic circuits represented, for example, by the signal term R1 C$dp$ applied to the # set input terminal of the stage R–6 and the signal term $\overline{R1}$ C$dp$ applied to the # reset input terminal of the stage R–6.

The signal C$dp$ is the output signal from clock pulse driver C$d$–2 shown in FIG. 29. It will be recalled that the clock pulse C$dp$ is generated when the conditions for accepting a new phoneme representation have been met as discussed hereinbefore. It will be recalled in the discussion of the * input circuits to the stages R–1 to R–5 of the R-register that when the acceptance tests are met the new encoded phoneme in A-register is transferred to the stages R–1 . . . R–5 of the R-register upon the occurrence of the clock pulse C$dp$. From the present consideration of FIG. 27 it is seen that upon the occurrence of the same clock pulse C$dp$ the column shift of the R-register is accomplished.

The serial recirculating shifting structure is illustrated, for example, by the signal term R5 C$ds$ applied to the # set input terminal of stage R–6 and the signal term $\overline{R5}$ C$ds$ applied to the # reset input terminal of stage R–6. Thus an input circuit is provided to each stage for sensing the state of the previous stage of the series. The clock pulse C$ds$ is the output signal of the clock pulse driver circuit C$d$–3 of FIG. 29. This clock pulse driver produces a clock pulse C$ds$ upon the occurrence of each bit clock pulse C$p$ when the input terminal of the clock driver circuit is armed. The logic gating circuit to the arming input of the clock pulse driver C$d$–3 is shown in FIG. 29 in logic equation form. The signal term S$s$ ($t1$–$t35$) $\overline{L}$ represents a logic circuit which is effective during the Operate mode of operation for arming the clock pulse driver C$d$–3. The signal S$s$ from the serial shift flip-flop of FIG. 24 is up, as discussed hereinbefore, to control the serial shift of R-register. The term ($t1$–$t35$) is a parenthetical term as defined in FIG. 30 which is up during the bit times $t1$–$t35$ of each sector. The signal $\overline{L}$ is a signal from the Load-Operate switch of FIG. 34, and it is up during the Operate mode of operation of the system. Thus when the Load-Operate switch is set to the Operate position and the signal S$s$ is up to indicate that a serial shift of R-register is to take place, the clock pulse driver C$d$–3 produces a clock pulse C$ds$ during each of the bit times $t1$–$t35$.

The signal term C$sd$ S$s$ ($t1$–$t35$) represents a logic circuit which is effective to arm the clock pulse driver C$d$–3 during a Load operation. The signal C$sd$ is the signal from the sector address comparison circuit of FIG. 46. This signal is up during the sector selected to receive the new word during the Load operation. Thus when the signals C$sd$ and S$s$ are up a clock pulse C$ds$ is produced during each of the bit times $t1$–$t35$ of the selected sector.

The bit times $t1$–$t35$ correspond to the bit positions of each sector of the drum in which the phoneme representations are stored on the drum. This is shown in FIG. 26 which is an illustration of a representative sector of the drum. The first 35 bits of the sector store the phoneme representation. The next 11 bits are reserved for the word designator corresponding to the phoneme stored in the sector. The last four bits of each sector are space bits for the purpose of allowing switching transients to die out during read operations and to allow, during write operations, the writing current to be established in a given direction in the head before valid information is written. Thus it can be seen that the R-register is serially shifted only during the bit times $t1$–$t35$, the phoneme part of each sector.

Memory Unit

The memory unit of the illustrated embodiment of a signal recognition system of the present invention includes a magnetic drum shown in FIG. 28 along with an associated write input circuit, the head switching and driving circuit and a read output circuit. (The drum of FIG. 28 is represented in FIG. 1 by the memory 119. The write input, read output, and head switching and driving circuits are represented in FIG. 1 by the read-write circuit 123. The memory unit also includes a drum timing or D-counter employed for developing control signals for synchronizing the operation of the system with the rotation of the magnetic drum. This D-counter comprises four parts: the bit counter shown in FIG. 31, the sector counter shown in FIG. 32, the track counter shown in FIG. 35, and the revolution counter shown in FIG. 36. The D-counter will be discussed more fully after a discussion of the drum and the associated circuits of FIG. 28.

The magnetic drum of the illustrated embodiment includes an origin pulse track, a clock track and 13 memory tracks. The origin pulse track contains only one recorded pulse as a reference mark to identify the first sector of the memory tracks. Positioned to read the origin pulse track is a read head 2801 which is connected to the input terminal of the origin pulse amplifier-inverter 2802. The signals O$p$ and $\overline{Op}$ are the output signals from the origin pulse amplifier-inverter. Signal O$p$ is normally down and the signal $\overline{Op}$ is normally up. When the read head 2801 reads the recorded origin pulse the signal O$p$ is up for one clock period, the signal $\overline{Op}$ being down at the same time.

The clock pulse track contains 2000 bits and constitutes the basic synchronizing pulse source of the system. A read head 2803 is positioned to read this clock track. The read head 2803 is connected to the input terminal of an amplifier-shaper 2804 which responds to signals from the read head in well-known fashion to produce a bit clock pulse C$p$ every four microseconds.

Each of the 13 memory tracks contains 40 sectors of fifty bits each. An example of a sector is illustrated in FIG. 26 as discussed hereinbefore. Read and write heads which sense the memory tracks are connected to a head switching and driving circuit 2805. This circuit includes a head switching matrix and read and write amplifiers for connecting the write input circuit and the read output circuit to appropriate ones of the memory track heads under control of signals from the track counter as indicated in FIG. 28. Details of the head switching and driving circuit 2805 are not shown herein. (A suitable embodiment of such a circuit is shown in FIGS. 49, 50 and 51 of a U.S. patent application Serial No. 70,549, filed November 21, 1960, by C. H. Propster, Jr., for an Electronic Data Processor, and assigned to the same assignee as the present invention.)

Signals read from the drum are delivered by the circuit 2805 to a read output circuit comprising a read amplifier-inverter 2806 and a read flip-flop M–1. Respective output terminals of the amplifier-inverter 2806 are connected to the # set and reset input terminals of the flip-flop M–1. The non-restore-to-zero method of recording is assumed. Magnetization in one direction is representative of a binary "0" and in the other direction a binary "1." There is a change in magnetization only when there is a change from a "1" to a "0" or vice versa. The read head responds to such changes in magnetization to produce a pulse at the input terminal of the amplifier-inverter 2806, the pulse having a positive or negative polarity depending on the direction of change. In response to an input pulse the amplifier-inverter 2806 produces a signal #M at the # set input terminal of flip-flop M–1 and a complementary signal #$\overline{M}$ at the # reset input terminal. The flip-flop M–1 is therefore triggered in accordance with the polarity of the pulse from the read head. It is arranged that the set output signal M is up and the reset output signal $\overline{M}$ down when a "1" is read and when a "0" is read the signal M is down and the signal $\overline{M}$ is up.

The write input circuit of FIG. 28 is illustrated in logic equation form. Three signals are applied to the head switching and driving circuit 2805 to control the write amplifiers thereof for writing information on the drum. These signals are the enable signal *W$a'$ which is up to enable the write amplifier of circuit 2805, the signal *W$a$ which is up to write a "1," and the signal *$\overline{Wa}$ which is up to write a "0." (The signals *W$a'$, ,*W$a$ and *$\overline{Wa}$ may be applied, for example, to the terminals RS1, WFF1 and WFF0 respectively of a write amplifier shown in FIG. 18 of the above-mentioned application Serial No. 70,549.) The enable signal *W$a'$ is up when the signal C$sd$ is up. It will be recalled that signal C$sd$ is the output signal of the sector address comparison circuit of FIG. 46 and that it is up when the selected sector is located during the Load mode of operation.

The write "1" signal *W$a$ is up when the signal ($t50$) is up. The signal ($t50$) is the output signal of the logic circuit shown in FIG. 30 in logic equation form. The signal ($t50$) is up during the $t50$ bit time of each sector. The $t50$ bit is the last bit of each sector and a "1" is written therein so that the read flip-flop M–1 is in a predetermined state at the beginning of each sector.

It will be recalled that in the Load mode of operation the R-register is serially shifted during the phoneme part of the sector, that is, during bit times $t1$–$t35$. Thus the logic circuits represented by signal term R35 ($t1$–$t35$) of the write "1" signal *W$a$ and signal term $\overline{R35}$ ($t1$–$t35$) of the write "0" signal *$\overline{Wa}$ serve to detect each bit of the phoneme sequence in R-register and to transfer it to the phoneme part of the selected sector.

Similarly, the output or Or-register, which receives the word designator corresponding to the new word is serially shifted during the word designator part of the selected sector, that is, during bit times $t36$–$t46$. Thus the logic circuits represented by signal terms O$r$11 ($t36$–$t46$) and and $\overline{Or11}$ ($t36$–$t46$) serve to detect each bit of the word designator in Or-register and transfer it to the word designator part of the selected sector.

D-Counter

Addressing circuitry is required to write into and read from selected portions of the drum memory. The several parts of the D-counter serve this purpose. (The D-counter of FIGS. 31–36 is included in the Timing and Control circuit 124 of FIG. 1.)

Stages D–1 . . . D–6 of the D-counter comprise a bit counter shown in FIG. 31, the input logic gating circuits of which are shown in logic equation form. It will be noted that these stages are triggered by the bit clock pulse C$p$. Examination of the input logic of the bit counter of FIG. 31 will show that this counter is a straight binary counter, that is, the count is advanced one count each bit clock pulse C$p$ with the exception that when the count reaches "100010" the next clock pulse C$p$ causes the D-counter to indicate a count of "110001." (The intervening counts are skipped by virtue of the signal term D2 $\overline{D5}$ D6 in the *$\overline{D2}$ and *D5 equations.)

It will be noted that the origin pulse signal O$p$ is applied to the * reset input terminal of each of the stages D–1 . . . D–6. This signal resets the counter upon the occurrence of the first origin pulse O$p$ when the machine is first turned on, thus synchronizing the bit counter with the rotation of the drum.

The output signals of the bit counter are connected to logic circuits, such as are defined by the logic equations in FIG. 30, for producing the various address control or timing signals. (The logic circuits illustrated in FIG. 30 are included in the Timing and Control circuit 124 of FIG. 1.)

The sector counter is shown in FIG. 32 and it comprises the stages D–7 . . . D–12 of the D-counter. The output signals from the stages of this counter indicate to the system which one of the 40 sectors of each track is passing adjacent the reading and writing station.

It is noted that the stages of the sector counter shown in FIG. 32 are triggered by the clock pulse $Cd1$. Clock pulse $Cd1$ is the output signal from a clock driver $Cd$–1 shown in FIG. 29. The clock pulse driver $Cd$–1 produces a clock pulse $Cd1$ whenever the signal ($t46$) is up or when the origin pulse signal $Op$ is up. The signal ($t46$) is the output signal of a logic circuit defined in FIG. 30 which circuit receives its input signal from the bit counter of FIG. 31. The signal ($t46$) is up during bit time $t46$ of each sector, the last of the word designator bits. The origin pulse $Op$ is up during $t50$ time of sector 40.

The sector counter of FIG. 32 is a straight binary counter modified so that it counts from "000001" (binary "1") to "101000" (binary 40) and then resets to "000001." The origin pulse $Op$ is applied to the set input terminal of stage D–7 and to the reset input terminals of the stages D–8 . . . D–12 to synchronize the sector counter with the rotation of the drum when the machine is first turned on. Note that the signal $\overline{Op}$ is applied to the * reset input terminal of stage D–7 and to the * set input terminal of stage D–8. This prevents the origin pulse $Op$ from erroneously advancing the count in the counter after the counter has been correctly counted to "000001" at the $t47$ bit time of sector 40.

The track counter is shown in FIG. 35 with its input logic gating circuit shown in logic equation form. The track counter comprises the stages D–13 . . . D–16 of the D-counter. The bit and sector counters described above count continuously as long as the machine is turned on. The track counter however counts only when the system is in the Operate mode and a search of the memory is in progress. The purpose of the track counter is to control the switching of the heads of the memory unit to the proper track. During the Operate mode when a search is in progress the track counter is counted so that the 13 memory tracks on the drum are searched sequentially. During a Load operation the track counter is not counted but is set by a group of push-button switches, shown in FIG. 43, to the address of the track containing the sector in which the new word is to be recorded.

The stages of the track counter are triggered by the clock pulse $Cdt$. The clock pulse $Cdt$ is the output signal of a clock pulse driver $Cd$–4 shown in FIG. 29. The clock pulse driver $Cd$–4 produces a clock pulse $Cdt$ in response to arming levels of signals $Ct$ and $\overline{L}$. The signal $Ct$ is the output signal of a logic circuit illustrated in FIG. 30 in logic equation form. The signal $Ct$ is up during bit time $t46$ of sector 40, that is, the signal $Ct$ occurs once each revolution on the drum. The signal $\overline{L}$ is the output signal of the Load-Operate switch of FIG. 34 and this signal is up during the Operate mode of operation. (The Load-Operate switch of FIG. 34 is included in the Timing and Control circuit 124 of FIG. 1.) Thus the clock pulse $Cdt$ occurs once each revolution of the drum at $t46$ time of sector 40 when the system is in the Operate mode.

As may be seen by the logic equations of the gating circuits connected to the * inputs of the track counter, the counting of the counter is controlled by the search signal $Sp$ and serial shift flip-flops of FIGS. 23 and 24. The track counter is a straight binary counter which is reset to "0000" by the signal term $Sp\,\overline{Ss}$ applied to the * reset input terminal of each stage. During the Operate mode when the serial shift signal $Ss$ is up the count proceeds on each signal $Ct$ until the signal $Ss$ goes to a disarming level. As described above in the discussion of the serial shift flip-flop $Ss$–1 of FIG. 24, the signal $Ss$ goes down either when a match is found between the phoneme sequence in R-register and a stored phoneme sequence in the memory, as indicated by the signal term $Mer$ ($t46$), or when an unsuccessful search has been made, as indicated by the signal $Us$, which is the output signal of the unsuccessful search logic circuit shown in FIG. 39.

During the Load mode of operation the track counter does not count because the signal $\overline{L}$ required at the input of the clock pulse driver $Cd$–4 of FIG. 29 is down and therefore the clock pulse $Cdt$ is not generated. As mentioned hereinbefore during a Load operation the track counter is set by push-button switches to select the track containing the desired sector in which the new word is to be written or recorded. The track selection push-button switches are shown in FIG. 43 and the output terminals of the switches are connected to the # input terminals of the track counter stages D–13 . . . D–16 as indicated in FIG. 35.

The stage D–17 of the D-counter shown in FIG. 36 constitutes a scale-of-two drum revolution counter. The output signals from stage D–17 are employed in the generation of the sample signal T1 which, as mentioned hereinbefore, must occur every 20 milliseconds. Since the drum makes one revolution every 10 milliseconds, the sample signal T1 occurs every other drum revolution. The stage D–17 is therefore provided to count down the drum revolutions by a factor of two. As mentioned hereinbefore, the signal $Ct$ applied to the * set and reset input terminals of the stage D–17 is the output signal of a logic circuit defined in logic equation form in FIG. 30. This circuit receives signals from the bit and sector counters and the signal $Ct$ is produced once each revolution of the drum at bit time $t46$ of sector 40. The set output signal D17 is applied to an input terminal of a logic gating circuit, shown symbolically in FIG. 33, for producing the sample signal T1. (The logic circuit of FIG. 33 is included in the Timing and Control circuit 124 of FIG. 1.)

*Comparison Circuit C–3*

The comparison circuit C–3 is illustrated in FIG. 37. The circuit includes a single flip-flop $Mer$–1, the input logic gating circuits to this flip-flop being shown in logic equation form. The purpose of the circuit is to indicate when a comparison is found between the phoneme sequence being serially circulated in the R-register and the stored phoneme sequences being scanned on the drum. During the serial search phase of operation of the system the stage $Mer$–1 is set every $t50$ bit time by the signal term $Ss$ ($t50$) $\overline{L}$. The signal $Ss$ is up during a serial shift operation as previously described. The signal $\overline{L}$ is up during the Operate mode of operation. The signal ($t50$) is the output signal of the logic gating circuit shown in FIG. 30 in logic equation form. The signal ($t50$), which is derived from the output signals from the bit counter, is up at $t50$ time of each sector which, it will be recalled, is the last bit of each sector.

During the scanning of the next sector of the drum, the flip-flop $Mer$–1 remains in its set state if the successively compared bits of the encoded phonemes in the R-register and in that sector are the same. However when a pair of the bits fail to compare a signal is produced which resets the flip-flop $Mer$–1. This is accomplished by the circuit represented by the logic equation for the reset input signal *$\overline{Mer}$. The signal terms (R35+M) and ($\overline{R35}+\overline{M}$) are of course the bit comparison signal terms. Both of these terms will be up to enable the reset input only when the bit from R-register and the bit from the memory are not the same. The signal ($t1$–$t35$) is up during the phoneme part of each sector as described hereinbefore.

If a comparison is found the flip-flop $Mer$–1 will still be in its set state, with its set output signal $Mer$ up, at $t46$ time. In this event the signal term M$er$ ($t46$) causes the resetting of the flip-flop M$er$–1 and also of the serial shift flip-flop S$s$–1 of FIG. 24 to thereby terminate the search. This signal term also results in an arming level of the signal C$mr$, FIG. 38, during $t46$ time. (The logic circuit of FIG. 38 is included in the Timing and Control circuit 124 of FIG. 1.) The signal C$mr$ indicates to external equipment that a comparison has been found and that the corresponding word designator has been transferred to the output register and is available for use by the external equipment.

Or-Register

The output or Or-register is a shift register comprising stages O$r$–1 . . . O$r$–11, shown in FIG. 40, with the input logic gating circuits thereof illustrated in logic equation form. The Or-register serves two purposes. When a comparison has been found during the Operate mode of operation the word designator corresponding to the identified phoneme sequence is transferred to the Or-register where it is available for use by external equipment. During the Load mode of operation of the system the Or-register temporarily stores the word designator of the new word, the phoneme sequence of which is to be recorded in the memory. When the selected sector is located the word designator is then transferred from the Or-register to the word designator portion of the sector.

The clock pulse which drives the output register is the clock pulse C$do$ which is the output signal of the clock pulse driver circuit C$d$–5 shown in FIG. 29. The input logic circuit of the clock pulse driver C$d$–5 is illustrated in Logic equation form. The signal term M$er$ ($t36$–$t46$) indicates that a clock pulse C$do$ is produced every bit time $t36$–$t46$ of the word designator portion of the sector when the signal M$er$ is up to indicate that a comparison has been found.

The * input circuits of the stage O$r$–1 detect the word designator bits as they are read from the drum as indicated by the signals M and $\overline{M}$ which are the output signals of the read amplifier of the circuit shown in FIG. 28. The stage O$r$–1 is therefore set and reset accordingly. (The * input circuits of the stage O$r$–1 thus include the transfer circuit 121 of FIG. 1.)

Logic circuits connected to the # input circuits of the stages O$r$–2 . . . O$r$–11 connect the stages of the output register in shift register fashion as indicated, for example, by the signal terms O$r$1 C$do$ and $\overline{Or1}$ C$do$ connected to the # set and # reset input terminals respectively of the stage O$r$–2. Thus the stage O$r$–1 receives each word designator bit which is then shifted stage-by-stage in the output register.

When the entire memory has been searched and no comparison is found an unsuccessful search signal U$s$ is produced by the logic circuit shown in FIG. 39. (The logic circuit of FIG. 39 is included in the Timing and Control circuit 124 of FIG. 1.) As illustrated in FIG. 40 the signal U$s$ is applied to a logic circuit connected to the * reset input of each of the stages O$r$–1 . . . O$r$–11 for the purpose of resetting the Or-register.

As mentioned above, during the Load mode of operation of the system the word designator corresponding to the new word is placed in the Or-register for subsequent recording into the selected sector of the drum memory. The entry of the new word designator is accomplished by a group of push-button switches 4501–4522 shown in FIG. 45. Output signals from these switches are connected to respective ones of the # input terminals of the stages of the Or-register. For example, a signal K$sor1$ is applied to the # set input terminal of stage O$r$–1. Thus when the push-button 4501 of FIG. 45 is depressed the stage O$r$–1 of FIG. 40 is placed in its set state.

Load Control Circuits

The purpose of the load control circuits is to control the recording of the phoneme sequence of a new word and the corresponding word designator into the selected sector of the drum memory.

When the selected sector is located the clock pulse driver circuit C$d$–3 of FIG. 29 must be enabled to produce a clock pulse C$ds$ each bit time of the phoneme portion of the sector for the purpose of serially shifting the R-register and transferring the new phoneme sequence therefrom to the phoneme part of the selected sector. The clock pulse driver C$d$–5 of FIG. 29 must be enabled to produce a clock pulse C$do$ each bit time of the word designator portion of the sector for the purpose of serially shifting the Or-register to thereby transfer the word designator stored therein to the word designator portion of the selected sector.

The load control circuits include the Load-Operate switch of FIG. 34, the Load operation initiation circuit of FIG. 41, the Load operation control circuit of FIG. 42, the track selection circuit of FIG. 43, the sector selection circuit of FIG. 44, the word designator selection circuit of FIG. 45, and the sector address comparison circuit of FIG. 46 for producing the sector address comparison signal C$sd$. (These control circuits are included in the Timing and Control circuit 124 of FIG. 1.)

The procedure for loading or recording a new word into the memory unit is as follows: The Load-Operate switch in FIG. 34 is set to the load position whereby the signal L up and the signal $\overline{L}$ down. The operator then pronounces the new word in the manner he wishes it recorded and the phoneme sequence of the new word is assembled in the R-register in the manner described hereinbefore for the Operate mode of operation. However the memory search is now inhibited due to the disarming level of the signal $\overline{L}$ applied to the input circuit of the serial shift flip-flop S$s$–1 of FIG. 24. Appropriate ones of a bank of push-button switches 4301–4308 of the track selection circuit of FIG. 43 are then depressed to preset the track counter of FIG. 35 for selection of the selected track as previously explained. Similarly, a set of binary switches 4401–4406 of the sector selection circuit of FIG. 44 are adjusted to represent the selected sector of the selected track. As explained hereinbefore the word designator corresponding to the new word is placed in the Or-register by depressing appropriate ones of the set of push-button switches 4501–4522 of the word designator selection circuit of FIG. 45. A push-button switch 4101 in the # reset input circuit of the load initiating flip-flop L–1 of FIG. 41 is depressed. This produces the signal K$m$ which sets the flip-flop L–1.

The flip-flop L–1 cannot control the Load operation directly because it is set non-synchronously by the switch 4101. The load control flip-flop L–2 of FIG. 42 is therefore provided. The flip-flop L–2 is set by the arming level of signal L1 and the signal ($t46$) which is up at $t46$ time of each sector. (It will be noted that these signals also cause the flip-flop L–1 to be reset.) The load control signal L2 partially enables the sector address comparison circuit of FIG. 46 which produces the signal C$sd$ when a match is found between the signals from the sector selection circuit of FIG. 44 and the signals from the sector counter of FIG. 32. The comparison of these signals is accomplished by the sector address comparison logic circuit as illustrated in FIG. 46 and when the match is found the signal C$sd$ is up throughout the selected sector.

As shown in FIG. 28 the signal C$sd$ enables the write input circuit. It also enables the clock pulse driver C$d$–3 of FIG. 29 so that the block pulse signal C$ds$ is produced each bit time $t1$–$t35$ which corresponds to the phoneme portion of the sector. The signal C$sd$ also causes the serial shift of the R-register of FIG. 27. The arming level of the signal C$sd$ also enables the clock pulse driver C$d$–5 of FIG. 29 which thereupon produces a clock pulse C$do$ each of the bit times $t36$–$t46$ which corresponds to the word designator portion of the selected sector. The clock pulse C$do$ causes the serial shift of the word designator which has been placed in the output register of FIG. 40 as described hereinbefore.

Referring now to FIG. 42 the signal term $Csd$ ($t46$) causes the load control flip-flop L-2 to be reset at $t46$ time of the selected sector to terminate the Load operation.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any such modifications within the limits only of the true spirit and scope of the invention.

What is claimed is:

1. A system for identifying an item of information received as a sequence of information signals, comprising: an encoding circuit for receiving each information signal and for converting the same to a corresponding multiple bit binary signal pattern; a first register connected to said encoding circuit for receiving each signal pattern developed by said encoding circuit; a second register for receiving each signal pattern developed by said encoding circuit and for storing the last previous signal pattern developed by said encoding circuit; means for comparing the pattern in said first register with the pattern in said second register and for producing a first transfer signal when the patterns are the same; a third register for receiving signal patterns from said first register and for storing them in sequence; means for comparing the pattern in said first register with the last pattern received by said third register and for producing a second transfer signal when the patterns are not the same; means responsive to simultaneous first and second transfer signals for transferring the signal pattern in said first register to said third register; a memory device having a plurality of predetermined separate sequences of signal patterns stored therein; and means operable after the receipt of said sequence of information signals for comparing the sequence of signal patterns in said third register with the sequences of signal patterns in said memory device and for producing a unique information output signal corresponding to said item of information when a comparison is found.

2. A system for identifying a plurality of items of information each transmitted to said system as a separate sequence of signal patterns, comprising: a first register connected to receive each signal pattern transmitted to said system; a second register for receiving each signal pattern and for storing the last previous signal pattern transmitted to said system; a comparison circuit connecting said first and second register for comparing the patterns therein and for producing a first transfer signal when the signal patterns in said first and second registers are alike; a third register for receiving signal patterns and for storing them in sequence; means for comparing the last signal pattern received by said third register with the signal pattern in said first register and for producing a second transfer signal when the signal patterns are unlike; means jointly responsive to said first and second transfer signals for entering into said third register the same signal pattern as is in said first register; a memory device containing a plurality of predetermined separate sequences of stored signal patterns, each separate sequence corresponding to an item of information to be identified; and means operable after the storage of a sequence of signal patterns in said third register for comparing the same with said sequences of signal patterns in said memory device and for producing a corresponding information output signal when a comparison is found.

3. A system for identifying a plurality of items of information each transmitted to said system as a separate sequence of signal patterns, comprising: a first register connected to receive each signal pattern transmitted to said system; a second register for receiving each signal pattern and for storing the last previous signal pattern transmitted to said system; a comparison circuit connecting said first and second registers for comparing the signal patterns in said first and second registers and for producing a first comparison signal when the signal patterns in said first and second registers are alike; a third register for receiving signal patterns and for storing them in sequence; means for comparing the last signal pattern received by said third register with the signal pattern in said first register and for producing a second comparison signal when the signal patterns are unlike; means jointly responsive to said first and second comparison signals for entering into said third register the same signal pattern as is in said first register; a memory device containing a plurality of predetermined separate sequences of stored signal patterns and an associated identification signal corresponding respectively to each of the items of information to be identified; means operable after the receipt of a sequence of signal patterns for comparing the signal patterns in said third register with said separate sequences of stored signal patterns in said memory device and for producing a third comparison signal when a comparison is found; and means responsive to said third comparison signal for reading out from said memory device the associated identification signals.

4. A system for identifying a plurality of items of information, each item transmitted to said system as a sequence of $n$ bit binary signal patterns, comprising: a first register for receiving each signal pattern transmitted to said system; a second register for storing the last previous signal pattern transmitted to said system; means for comparing the signal pattern in said second register with the signal pattern in said first register and for producing a first comparison signal when the signal patterns in said first and second registers are alike; a third register having $m$ times $n$ stages for storing $m$ patterns of said $n$ bit binary signal patterns; means for comparing the signal pattern in the first $n$ stages of said third register with the signal pattern in said first register and for producing a second comparison signal when said signal patterns are unlike; means jointly responsive to said first and second comparison signals for shifting the signal pattern in the first $n$ stages of said third register to other stages of said third register and for placing in said first $n$ stages of said third register the same signal pattern as is in said first register; a memory containing a plurality of sequences of $m$ stored signal patterns, each sequence corresponding to one of the items of information to be identified; and means operable after the storage of $m$ signal patterns in said third register for comparing the same with the sequences of stored patterns in said memory and for producing a manifestation of the identity of the corresponding item of information when a comparison is found.

5. A system for identifying a plurality of items of information, each item being represented by a sequence of separate binary signal patterns, comprising: first means for receiving each pattern; second means for receiving signal patterns from said first means and for storing the last previous signal pattern received by said first means; means for comparing the patterns in said first and second means; third means for receiving signal patterns from said first means; means for comparing the patterns in said first and third means; means for transferring the signal pattern in said first means to said third means when the patterns in said first and second means are alike and when the patterns in said first and third means are unlike; means for storing a sequence of signal patterns received by said third means; and means for comparing said sequence of signal patterns with a set of standard sequences of signal patterns for identifying the item of information represented by each received sequence of signal patterns.

6. A system for identifying information represented by a sequence of irregularly occurring multiple bit binary signal patterns, comprising: a device for receiving each signal pattern; means defining a series of sample times; means for determining that the signal pattern in said device at a given sample time has persisted for a predetermined number of sample times and for producing a first transfer signal indicative thereof; storage means for receiving signal patterns from said device and for assembling a sequence of signal patterns representative of the information to be identified; means for determining that the signal pattern in said device at said given sample time is different from the signal pattern last transferred from said device to said storage means and for producing a second transfer signal indicative thereof; and a transfer circuit responsive to said first and second transfer signals for transferring the signal pattern in said device at said given sample time to said storage means.

7. In a system for recognizing a spoken word by its sequence of phonemes, a circuit for assembling a sequence of phoneme representations corresponding to said word, comprising: a device for receiving phoneme representations; a storage means for receiving and storing phoneme representations from said device; a transfer circuit operable in response to simultaneous first and second enabling signals to transfer the phoneme representation in said device to said storage means; means for producing said first enabling signal when a phoneme representation has persisted for a predetermined period; and means for producing said second enabling signal when the phoneme representation in said device and the phoneme representation last transferred to said storage means are different.

8. In a system for receiving signals from a phoneme detector, a device for indicating that a signal has persisted for a predetermined period, comprising: a first circuit for receiving signals from said phoneme detector and for assuming a different information representing condition in response to each respective different signal; means for generating a series of sample signals; a second circuit, including means for detecting the information representing condition of said first circuit, operable in response to each sample signal to assume an information representing condition corresponding to the information representing condition of said first circuit; and comparison means for comparing the information representing condition of said first circuit with the information representing condition of said second circuit for producing a signal when the information representing conditions of said first and second circuits are alike.

9. In a system for recognizing a spoken word by its sequence of phonemes, a circuit for assembling a sequence of phoneme representations corresponding to said word wherein a phoneme representation is accepted only if it is different from the last phoneme representation accepted, comprising: a register for receiving phoneme representations; a storage device for receiving and storing accepted phoneme representations; a transfer circuit connecting said register to said storage device, said transfer circuit being operable when enabled to transfer the phoneme representation in said register to said storage device; and a comparison circuit connected to said register and to said storage device, said comparison circuit being operable to enable said transfer circuit when the phoneme representation in said register and the phoneme representation last received by said storage device are unlike and operable to disable said transfer circuit when the phoneme representation in said register and the phoneme representation last received by said storage device are alike.

10. A system for identifying a plurality of separate items of information, each item comprising a unique sequence of predetermined elements of information, comprising: means for receiving in sequence the elements of an item of information to be identified; means for accepting each element only if it persists for more than a predetermined time and only if it is different from the last accepted element; storage means for receiving and assembling the accepted elements in sequence; a memory containing stored standard sequences of elements each corresponding to one of said items of information; means for scanning said memory and for comparing the sequence of elements assembled in said storage means with said standard sequences of elements in said memory; and means for producing a manifestation of the identity of the item of information when a comparison is found.

11. In a system for identifying a plurality of separate items of information; each item comprising a unique sequence of predetermined elements of information, each received element persisting a variable length of time, means for converting a received sequence of variable length information elements to a corresponding sequence of equally spaced information elements comprising: sampling means for examining each received sequence of elements at equally spaced sample times and for producing an element representation of each element only if it persists for a predetermined number of sample times and only if it is different from the element corresponding to the last produced element representation; and means for receiving and assembling the element representations produced by said sampling means.

12. A system for receiving and storing sequences of phoneme representations corresponding to spoken words, comprising: means for receiving each phoneme representation and for accepting each received phoneme representation only if it persists for at least a predetermined period and only if it is different from the phoneme representation last accepted; means for assembling a sequence of accepted phoneme representations; a memory; and means operable after the assembly of a sequence of accepted phoneme representations for storing the same at a selected location in said memory.

13. A system for storing a sequence of phoneme representations corresponding to a spoken word, comprising: means for receiving each phoneme representation and for accepting each phoneme representation only if it persists for at least a predetermined period and only if it is different from the phoneme representation last accepted; means for assembling a sequence of accepted phoneme representations; means for receiving a word designator corresponding to said word; a memory; and means for storing said sequence of accepted phoneme representations and said word designator at a selected location in said memory.

References Cited in the file of this patent

UNITED STATES PATENTS

| | | |
|---|---|---|
| 2,521,733 | Lesti | Sept. 12, 1950 |
| 2,646,465 | Davis et al. | July 21, 1953 |
| 2,946,044 | Bolgiano et al. | July 19, 1960 |
| 2,983,904 | Moore | May 9, 1961 |
| 3,017,610 | Auerback et al. | Jan. 16, 1962 |
| 3,092,810 | Schmidt | June 4, 1963 |
| 3,093,814 | Wagner et al. | June 11, 1963 |

UNITED STATES PATENT OFFICE
CERTIFICATE OF CORRECTION

Patent No. 3,147,343 September 1, 1964

Burtis W. Meyer et al.

It is hereby certified that error appears in the above numbered patent requiring correction and that the said Letters Patent should read as corrected below.

Column 5, line 64, after "with" insert -- each of --; column 6, line 15, for "C-2" read -- C-3 --; column 8, line 43, for "Ss+Sp Ss" read -- Ss+Sp $\overline{Ss}$ --; column 17, line 10, strike out "and", second occurrence; column 19, line 30, for "fist" read -- first --; line 48, for "alternatively" read -- alternative --; column 26, line 58, for "ths" read -- the --; line 67, for "block" read -- clock --; column 28, line 28, for "signals" read -- signal --.

SEAL) Signed and sealed this 13th day of April 1965.
Attest:

ERNEST W. SWIDER
Attesting Officer

EDWARD J. BRENNER
Commissioner of Patents